United States Patent
Pederson

(10) Patent No.: US 9,967,030 B2
(45) Date of Patent: May 8, 2018

(54) BUILDING ILLUMINATION APPARATUS WITH INTEGRATED COMMUNICATIONS, SECURITY AND ENERGY MANAGEMENT

(71) Applicant: Federal Law Enforcement Development Services, Inc., St. Cloud, MN (US)

(72) Inventor: John C. Pederson, Merritt Island, FL (US)

(73) Assignee: Federal Law Enforcement Development Services, Inc., St. Cloud, MN (US)

( * ) Notice: Subject to any disclaimer, the term of this patent is extended or adjusted under 35 U.S.C. 154(b) by 0 days. days.

(21) Appl. No.: 15/283,987

(22) Filed: Oct. 3, 2016

(65) Prior Publication Data

US 2017/0026118 A1    Jan. 26, 2017

Related U.S. Application Data

(63) Continuation of application No. 14/288,917, filed on May 28, 2014, now Pat. No. 9,461,740, which is a
(Continued)

(51) Int. Cl.
*H04B 10/00* (2013.01)
*H04B 10/116* (2013.01)
(Continued)

(52) U.S. Cl.
CPC .............. *H04B 10/116* (2013.01); *F21K 9/20* (2016.08); *G01S 1/70* (2013.01); *H04B 3/54* (2013.01);
(Continued)

(58) Field of Classification Search
CPC ... H04B 10/11; H04B 10/114; H04B 10/1143; H04B 10/1149; H04B 10/116
See application file for complete search history.

(56) References Cited

U.S. PATENT DOCUMENTS

| | | | |
|---|---|---|---|
| 700,678 | A | 5/1902 | Downie |
| 2,082,279 | A | 6/1937 | Fore |

(Continued)

FOREIGN PATENT DOCUMENTS

| | | |
|---|---|---|
| AU | 2006201345 | 10/2007 |
| AU | 2007202909 | 2/2008 |

(Continued)

OTHER PUBLICATIONS

Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.
(Continued)

*Primary Examiner* — Daniel Dobson
(74) *Attorney, Agent, or Firm* — Vidas, Arrett & Steinkraus, P.A.

(57) ABSTRACT

An LED light and communication system includes one or more optical transceivers that have a light support having a plurality of light emitting diodes and one or more photodetectors attached thereto, and a processor in communication with the light emitting diodes and the one or more photodetectors. The processor is constructed and arranged to generate a communication signal. The one or more optical transceivers are engaged to a lighting fixture within a building. The one or more optical transceivers are constructed and arranged to communicate with a name tag.

17 Claims, 10 Drawing Sheets

Related U.S. Application Data continuation of application No. 13/427,358, filed on Mar. 22, 2012, now Pat. No. 8,744,267, which is a continuation of application No. 12/126,342, filed on May 23, 2008, now abandoned.

(60) Provisional application No. 60/931,611, filed on May 24, 2007.

(51) Int. Cl.

| | | |
|---|---|---|
| *H04B 10/11* | (2013.01) | |
| *H04B 10/114* | (2013.01) | |
| *H05B 37/02* | (2006.01) | |
| *H04B 10/40* | (2013.01) | |
| *G01S 1/70* | (2006.01) | |
| *H04B 10/50* | (2013.01) | |
| *H04Q 11/00* | (2006.01) | |
| *H04W 4/02* | (2018.01) | |
| *F21K 9/20* | (2016.01) | |
| *H04B 3/54* | (2006.01) | |
| *H05B 33/08* | (2006.01) | |
| *H04J 14/00* | (2006.01) | |

(52) U.S. Cl.
CPC ............ *H04B 10/00* (2013.01); *H04B 10/11* (2013.01); *H04B 10/1143* (2013.01); *H04B 10/1149* (2013.01); *H04B 10/40* (2013.01); *H04B 10/502* (2013.01); *H04Q 11/0003* (2013.01); *H04W 4/025* (2013.01); *H05B 33/0854* (2013.01); *H05B 33/0872* (2013.01); *H05B 37/0227* (2013.01); *H05B 37/0263* (2013.01); *H05B 37/0272* (2013.01)

(56) References Cited

U.S. PATENT DOCUMENTS

| | | |
|---|---|---|
| 3,469,686 A | 9/1969 | Gutsche et al. |
| 3,696,384 A | 10/1972 | Lester |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard |
| 4,271,408 A | 6/1981 | Teshima |
| 4,298,806 A | 11/1981 | Herold |
| 4,301,461 A | 11/1981 | Asano |
| 4,319,306 A | 3/1982 | Stanuch |
| 4,336,580 A | 6/1982 | Mouyard |
| 4,342,944 A | 8/1982 | SpringThorpe |
| 4,368,979 A | 1/1983 | Ruell |
| 4,390,931 A | 6/1983 | Gorick |
| 4,434,510 A | 2/1984 | Lemelson |
| 4,445,132 A | 4/1984 | Ichikawa |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss |
| 4,615,131 A | 10/1986 | Wakatake |
| 4,616,225 A | 10/1986 | Woudenberg |
| 4,630,180 A | 12/1986 | Muraki |
| 4,630,183 A | 12/1986 | Fujita |
| 4,633,280 A | 12/1986 | Takasu |
| 4,654,629 A | 3/1987 | Bezos |
| 4,703,219 A | 10/1987 | Mesquida |
| 4,710,977 A | 12/1987 | Lemelson |
| 4,716,296 A | 12/1987 | Bussiere |
| 4,720,835 A | 1/1988 | Akiba |
| 4,724,312 A | 2/1988 | Snaper |
| 4,742,432 A | 5/1988 | Thillays |
| 4,799,135 A | 1/1989 | Inukai |
| 4,821,118 A | 4/1989 | Lafreniere |
| 4,821,338 A | 4/1989 | Naruse |
| 4,868,719 A | 9/1989 | Kouchi |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton |
| 5,041,947 A | 8/1991 | Yuen |
| 5,045,767 A | 9/1991 | Wakatake |
| 5,050,055 A | 9/1991 | Lindsay |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson |
| 5,091,828 A | 2/1992 | Jincks |
| D324,921 S | 3/1992 | Stanuch |
| 5,093,768 A | 3/1992 | Ohe |
| 5,097,397 A | 3/1992 | Stanuch |
| 5,097,612 A | 3/1992 | Williams |
| 5,099,346 A | 3/1992 | Lee |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk |
| 5,172,113 A | 12/1992 | Hamer |
| 5,182,647 A | 1/1993 | Chang |
| 5,187,547 A | 2/1993 | Niina |
| 5,193,201 A | 3/1993 | Tymes |
| 5,198,746 A | 3/1993 | Gyugyi |
| 5,198,756 A | 3/1993 | Jenkins |
| 5,220,235 A | 6/1993 | Wakimizu |
| 5,224,773 A | 7/1993 | Arimura |
| 5,233,204 A | 8/1993 | Fletcher |
| 5,235,498 A | 8/1993 | VanDulmen |
| 5,247,380 A | 9/1993 | Lee |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert |
| 5,302,965 A | 4/1994 | Belcher |
| 5,313,187 A | 5/1994 | Choi |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai |
| 5,359,669 A | 10/1994 | Shanley |
| 5,361,190 A | 11/1994 | Roberts |
| 5,362,971 A | 11/1994 | McMahon |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe |
| 5,406,095 A | 4/1995 | Koyama |
| 5,410,328 A | 4/1995 | Yoksza |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase |
| 5,422,623 A | 6/1995 | Bader |
| 5,426,417 A | 6/1995 | Stanuch |
| 5,434,693 A | 7/1995 | Tanaka |
| 5,436,809 A | 7/1995 | Brassier |
| 5,450,301 A | 9/1995 | Waltz |
| 5,453,729 A | 9/1995 | Chu |

(56) References Cited

U.S. PATENT DOCUMENTS

| | | |
|---|---|---|
| 5,465,142 A | 11/1995 | Krumes |
| 5,471,371 A | 11/1995 | Koppolu |
| 5,475,241 A | 12/1995 | Harrah |
| 5,482,896 A | 1/1996 | Tang |
| 5,490,048 A | 2/1996 | Brassier |
| 5,490,049 A | 2/1996 | Montalan |
| 5,491,350 A | 2/1996 | Unno |
| 5,495,358 A | 2/1996 | Bartig |
| 5,498,883 A | 3/1996 | Lebby |
| 5,514,627 A | 5/1996 | Lowery |
| 5,516,727 A | 5/1996 | Broom |
| 5,519,720 A | 5/1996 | Hirano |
| 5,526,237 A | 6/1996 | Davenport |
| 5,528,474 A | 6/1996 | Roney |
| 5,532,472 A | 7/1996 | Furuta |
| 5,546,219 A | 8/1996 | Iida |
| 5,546,496 A | 8/1996 | Kimoto |
| 5,552,780 A | 9/1996 | Knockeart |
| 5,557,257 A | 9/1996 | Gieffers |
| 5,566,022 A | 10/1996 | Segev |
| 5,567,036 A | 10/1996 | Theobald |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa |
| 5,598,290 A | 1/1997 | Tanaka |
| 5,604,480 A | 2/1997 | Lamparter |
| 5,606,444 A | 2/1997 | Johnson |
| 5,607,788 A | 3/1997 | Tomazic |
| 5,612,201 A | 3/1997 | DePlaen |
| 5,612,231 A | 3/1997 | Holm |
| 5,625,201 A | 4/1997 | Holm |
| 5,627,851 A | 5/1997 | Takahashi |
| 5,631,474 A | 5/1997 | Saitoh |
| 5,632,551 A | 5/1997 | Roney |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy |
| 5,635,902 A | 6/1997 | Hochstein |
| 5,635,981 A | 6/1997 | Ribacoff |
| 5,636,916 A | 6/1997 | Sokolowski |
| 5,643,357 A | 7/1997 | Breton |
| 5,644,291 A | 7/1997 | Jozwik |
| 5,656,829 A | 8/1997 | Sakaguchi |
| 5,660,461 A | 8/1997 | Ignatius |
| 5,661,645 A | 8/1997 | Hochstein |
| 5,661,742 A | 8/1997 | Huang |
| 5,664,448 A | 9/1997 | Swan |
| 5,674,000 A | 10/1997 | Kalley |
| 5,694,112 A | 12/1997 | VannRox |
| 5,696,500 A | 12/1997 | Diem |
| 5,697,175 A | 12/1997 | Schwartz |
| 5,705,047 A | 1/1998 | Lee |
| 5,707,891 A | 1/1998 | Izumi |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish |
| 5,736,925 A | 4/1998 | Knauff |
| 5,739,552 A | 4/1998 | Kimura |
| 5,739,592 A | 4/1998 | Rigsby |
| 5,758,947 A | 6/1998 | Glatt |
| 5,760,531 A | 6/1998 | Pederson |
| 5,781,105 A | 7/1998 | Bitar |
| 5,783,909 A | 7/1998 | Hochstein |
| 5,785,418 A | 7/1998 | Hochstein |
| 5,786,918 A | 7/1998 | Suzuki |
| 5,789,768 A | 8/1998 | Lee |
| 5,793,062 A | 8/1998 | Kish, Jr. |
| 5,796,376 A | 8/1998 | Banks |
| 5,804,822 A | 9/1998 | Brass |
| 5,805,081 A | 9/1998 | Fikacek |
| 5,805,209 A | 9/1998 | Yuge |
| 5,806,965 A | 9/1998 | Deese |
| 5,808,592 A | 9/1998 | Mizutani |
| 5,809,161 A | 9/1998 | Auty |
| 5,809,681 A | 9/1998 | Miyamoto |
| 5,810,833 A | 9/1998 | Brady |
| 5,818,421 A | 10/1998 | Ogino |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda |
| 5,838,116 A | 11/1998 | Katyl |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman |
| 5,875,261 A | 2/1999 | Fitzpatrick |
| 5,884,997 A | 3/1999 | Stanuch |
| 5,898,381 A | 4/1999 | Gartner |
| 5,900,850 A | 5/1999 | Bailey |
| 5,917,637 A | 6/1999 | Ishikawa |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt |
| 5,936,417 A | 8/1999 | Nagata |
| 5,939,996 A | 8/1999 | Kniveton |
| 5,948,038 A | 9/1999 | Daly |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino |
| 5,990,802 A | 11/1999 | Maskeny |
| 5,991,085 A | 11/1999 | Rallison |
| 6,009,650 A | 1/2000 | Lamparter |
| 6,014,237 A | 1/2000 | Abeles |
| 6,018,899 A | 2/2000 | Hanitz |
| 6,028,694 A | 2/2000 | Schmidt |
| 6,035,053 A | 3/2000 | Yoshioka |
| 6,035,055 A | 3/2000 | Wang |
| 6,035,074 A | 3/2000 | Fujimoto |
| 6,067,010 A | 5/2000 | Wang |
| 6,067,011 A | 5/2000 | Leslie |
| 6,067,018 A | 5/2000 | Skelton |
| 6,072,893 A | 6/2000 | Luo |
| 6,081,206 A | 6/2000 | Kielland |
| 6,081,304 A | 6/2000 | Kuriyama |
| 6,086,229 A | 7/2000 | Pastrick |
| 6,091,025 A | 7/2000 | Cotter |
| 6,094,148 A | 7/2000 | Henry |
| 6,095,661 A | 8/2000 | Lebens |
| 6,095,663 A | 8/2000 | Pond |
| 6,102,696 A | 8/2000 | Osterwalder |
| 6,106,137 A | 8/2000 | Adams |
| 6,111,671 A | 8/2000 | Bahuguna |
| 6,118,388 A | 9/2000 | Morrison |
| 6,121,898 A | 9/2000 | Moetteli |
| 6,126,087 A | 10/2000 | Hedger |
| 6,159,005 A | 12/2000 | Herold |
| 6,166,496 A | 12/2000 | Lys |
| 6,177,678 B1 | 1/2001 | Brass |
| 6,183,100 B1 | 2/2001 | Suckow |
| 6,188,738 B1 | 2/2001 | Sakamoto |
| 6,243,492 B1 | 6/2001 | Kamei |
| 6,249,340 B1 | 6/2001 | Jung |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung |
| 6,292,575 B1 | 9/2001 | Bortolussi |
| 6,293,904 B1 | 9/2001 | Blazey |
| 6,318,886 B1 | 11/2001 | Stopa |

(56) References Cited

U.S. PATENT DOCUMENTS

| | | |
|---|---|---|
| 6,352,358 B1 | 3/2002 | Lieberman |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama |
| 6,396,954 B1 | 5/2002 | Kondo |
| 6,400,828 B2 | 6/2002 | Covell |
| 6,411,022 B1 | 6/2002 | Machida |
| 6,424,269 B1 | 7/2002 | Pederson |
| 6,426,599 B1 | 7/2002 | Leeb |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,504,646 B1 | 1/2003 | Amoruso |
| 6,532,212 B1 | 3/2003 | Soloway |
| 6,547,410 B1 | 4/2003 | Pederson |
| 6,548,967 B1 | 4/2003 | Dowling |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson |
| 6,892,942 B1 | 5/2005 | Widl |
| 7,006,768 B1 | 2/2006 | Franklin |
| 7,023,469 B1 | 4/2006 | Olson |
| 7,046,160 B2 | 5/2006 | Pederson |
| 7,102,665 B1 | 9/2006 | Chandler |
| 7,103,614 B1 | 9/2006 | Kucik |
| 7,178,941 B2 | 2/2007 | Roberge |
| 7,183,895 B2 | 2/2007 | Bazakos |
| 7,230,884 B2 | 6/2007 | Shemesh |
| 7,289,731 B2 | 10/2007 | Thinguldstad |
| 7,309,965 B2 | 12/2007 | Dowling |
| 7,321,757 B2 | 1/2008 | Yamashita |
| 7,323,991 B1 | 1/2008 | Eckert |
| 7,324,757 B2 | 1/2008 | Wilson |
| 7,333,735 B1 | 2/2008 | Goorjian |
| 7,352,972 B2 | 4/2008 | Franklin |
| 7,439,847 B2 | 10/2008 | Pederson |
| 7,439,874 B2 | 10/2008 | Sotiriou |
| 7,529,488 B2 | 5/2009 | Burdick |
| 7,548,698 B2 | 6/2009 | Yamamoto |
| 7,557,521 B2 | 7/2009 | Lys |
| 7,583,901 B2 | 9/2009 | Nakagawa |
| 7,689,130 B2 | 3/2010 | Ashdown |
| 7,715,723 B2 | 5/2010 | Kagawa |
| 7,912,377 B2 | 3/2011 | Koga |
| 7,940,191 B2 | 5/2011 | Hierzer |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |
| 8,421,588 B1 | 4/2013 | Ross |
| 8,538,692 B2 | 9/2013 | Wurman |
| 8,571,411 B2 | 10/2013 | Pederson |
| 8,593,299 B2 | 11/2013 | Pederson |
| 8,687,965 B2 | 4/2014 | Pederson |
| 8,729,833 B2 | 5/2014 | Chemel |
| 8,744,267 B2 | 6/2014 | Pederson |
| 8,886,045 B2 | 11/2014 | Pederson |
| 8,890,773 B1 | 11/2014 | Pederson |
| 8,891,962 B2 | 11/2014 | Du |
| 8,902,076 B2 | 12/2014 | Pederson |
| 8,965,460 B1 | 2/2015 | Rao |
| 9,413,469 B2 | 8/2016 | Eden |
| 9,461,748 B2 | 10/2016 | Pederson |
| 2002/0109892 A1 | 8/2002 | Seto |
| 2002/0168958 A1 | 11/2002 | Ford |
| 2002/0181044 A1 | 12/2002 | Kuykendall, Jr. |
| 2003/0025608 A1 | 2/2003 | Pederson |
| 2003/0118216 A1 | 6/2003 | Goldberg |
| 2003/0156037 A1 | 8/2003 | Pederson |
| 2003/0169164 A1 | 9/2003 | Lau |
| 2003/0185340 A1 | 10/2003 | Frantz |
| 2003/0212996 A1 | 11/2003 | Wolzien |
| 2003/0222587 A1* | 12/2003 | Dowling, Jr. ...... G06Q 30/0201 315/149 |
| 2004/0028349 A1 | 2/2004 | Nagasaka |
| 2004/0044709 A1 | 3/2004 | Cabrera |
| 2004/0101312 A1 | 5/2004 | Cabrera |
| 2004/0151344 A1 | 8/2004 | Farmer |
| 2004/0153229 A1 | 8/2004 | Gokturk |
| 2004/0208599 A1 | 10/2004 | Swartz |
| 2005/0002673 A1 | 1/2005 | Okano |
| 2005/0005794 A1 | 1/2005 | Inukai |
| 2005/0057941 A1 | 3/2005 | Pederson |
| 2005/0111533 A1 | 5/2005 | Berkman |
| 2005/0111700 A1 | 5/2005 | OBoyle |
| 2005/0128751 A1 | 6/2005 | Roberge |
| 2005/0169643 A1 | 8/2005 | Franklin |
| 2005/0231128 A1 | 10/2005 | Franklin |
| 2006/0039698 A1 | 2/2006 | Pautler |
| 2006/0056855 A1 | 3/2006 | Nakagawa |
| 2006/0132382 A1 | 6/2006 | Jannard |
| 2006/0149813 A1 | 7/2006 | Janik |
| 2006/0192672 A1 | 8/2006 | Gidge |
| 2006/0193634 A1 | 8/2006 | Wang |
| 2006/0213731 A1 | 9/2006 | Lesesky |
| 2006/0238368 A1 | 10/2006 | Pederson |
| 2006/0253598 A1 | 11/2006 | Nakamura |
| 2006/0262545 A1 | 11/2006 | Piepgras |
| 2006/0275040 A1 | 12/2006 | Franklin |
| 2007/0041732 A1 | 2/2007 | Oki |
| 2007/0104239 A1 | 5/2007 | Koga |
| 2007/0110446 A1 | 5/2007 | Hong |
| 2007/0145915 A1 | 6/2007 | Roberge |
| 2007/0147843 A1 | 6/2007 | Fujiwara |
| 2007/0160373 A1 | 7/2007 | Biegelsen |
| 2007/0165244 A1 | 7/2007 | Yukhin |
| 2007/0195263 A1 | 8/2007 | Shimizu |
| 2007/0258718 A1 | 11/2007 | Furlong |
| 2007/0269219 A1 | 11/2007 | Teller |
| 2007/0285026 A1 | 12/2007 | Johler |
| 2007/0294029 A1 | 12/2007 | DAndrea |
| 2008/0044188 A1 | 2/2008 | Kagawa |
| 2008/0063404 A1 | 3/2008 | Broyde |
| 2008/0128505 A1 | 6/2008 | Challa |
| 2008/0138077 A1 | 6/2008 | Stretton |
| 2008/0154101 A1 | 6/2008 | Jain |
| 2008/0170536 A1 | 7/2008 | Marshack |
| 2008/0214219 A1 | 9/2008 | Matsushima |
| 2008/0227463 A1 | 9/2008 | Hizume |
| 2008/0292320 A1 | 11/2008 | Pederson |
| 2009/0002265 A1 | 1/2009 | Kitaoka |
| 2009/0102396 A1 | 4/2009 | Petrucci |
| 2009/0129782 A1 | 5/2009 | Pederson |
| 2009/0157545 A1 | 6/2009 | Mobley |
| 2009/0262760 A1 | 10/2009 | Krupkin |
| 2009/0315481 A1 | 12/2009 | Zhao |
| 2009/0315485 A1 | 12/2009 | Verfuerth |
| 2010/0060194 A1 | 3/2010 | Furry |
| 2010/0111538 A1 | 5/2010 | Arita |
| 2010/0142965 A1 | 6/2010 | Breyer |
| 2010/0209105 A1 | 8/2010 | Shin |
| 2011/0006898 A1 | 1/2011 | Kruest |

(56) References Cited

U.S. PATENT DOCUMENTS

| | | |
|---|---|---|
| 2011/0128384 A1 | 6/2011 | Tiscareno |
| 2011/0140612 A1 | 6/2011 | Mohan |
| 2011/0208963 A1 | 8/2011 | Soffer |
| 2011/0225611 A1 | 9/2011 | Shintani |
| 2011/0294465 A1 | 12/2011 | Inselberg |
| 2011/0305460 A1 | 12/2011 | Snyder |
| 2012/0202520 A1 | 8/2012 | George |
| 2012/0230696 A1 | 9/2012 | Pederson |
| 2012/0240196 A1 | 9/2012 | Bhagwat |
| 2013/0015785 A1 | 1/2013 | Kamada |
| 2013/0201316 A1 | 8/2013 | Binder |
| 2013/0221848 A1 | 8/2013 | Miesak |
| 2013/0229346 A1 | 9/2013 | Jungbauer |
| 2013/0229492 A1 | 9/2013 | Ose |
| 2013/0341062 A1 | 12/2013 | Paquin |
| 2014/0153923 A1 | 6/2014 | Casaccia |
| 2014/0247907 A1 | 9/2014 | McCune |
| 2014/0286644 A1 | 9/2014 | Oshima |
| 2015/0078743 A1 | 3/2015 | Yang |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1205763 | 5/2002 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | S63153166 | 6/1988 |
| JP | 6333403 | 12/1994 |
| JP | 8002341 | 1/1996 |
| JP | 10098778 | 4/1998 |
| WO | 9750070 | 12/1997 |
| WO | 9935634 | 7/1999 |
| WO | 9942985 | 8/1999 |
| WO | 9949435 | 9/1999 |
| WO | 9949446 | 9/1999 |
| WO | 0074975 | 12/2000 |
| WO | 0101675 | 1/2001 |
| WO | 0110674 | 2/2001 |
| WO | 0110675 | 2/2001 |
| WO | 0110676 | 2/2001 |
| WO | 0225842 | 3/2002 |
| WO | 02073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Hawaiian Electric Company, Inc.: Powerlines—Energy Efficiency Takes-off at Honolulu International Airport, Spring 2008, pp. 1-13.

Jeffrey B. Carruthers, "Wireless Infrared Communications," Wiley Encyclopedia of Telecommunications, 2002.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," Sep. 15, 2002; Sep. 15, 2002-Sep. 18, 2002, vol. 4, Sep. 15, 2002, pp. 1762-1766.

Pacific Northwest National Laboratory: Demonstration Assement of Light-Emitting Diode (LED) Parking Lot Lighting, Phase 1, Jun. 2010, pp. 1-37.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date Feb. 1, 2003 pp. 71-79.

Van Wicklen, Garrett L.: Using Led Lights Can Reduce Your Electricity Costs, Dec. 2005, Cooperative Extension Service, Applied Poultry Engineering News, vol. 3, No. 1, pp. 1-4.

* cited by examiner

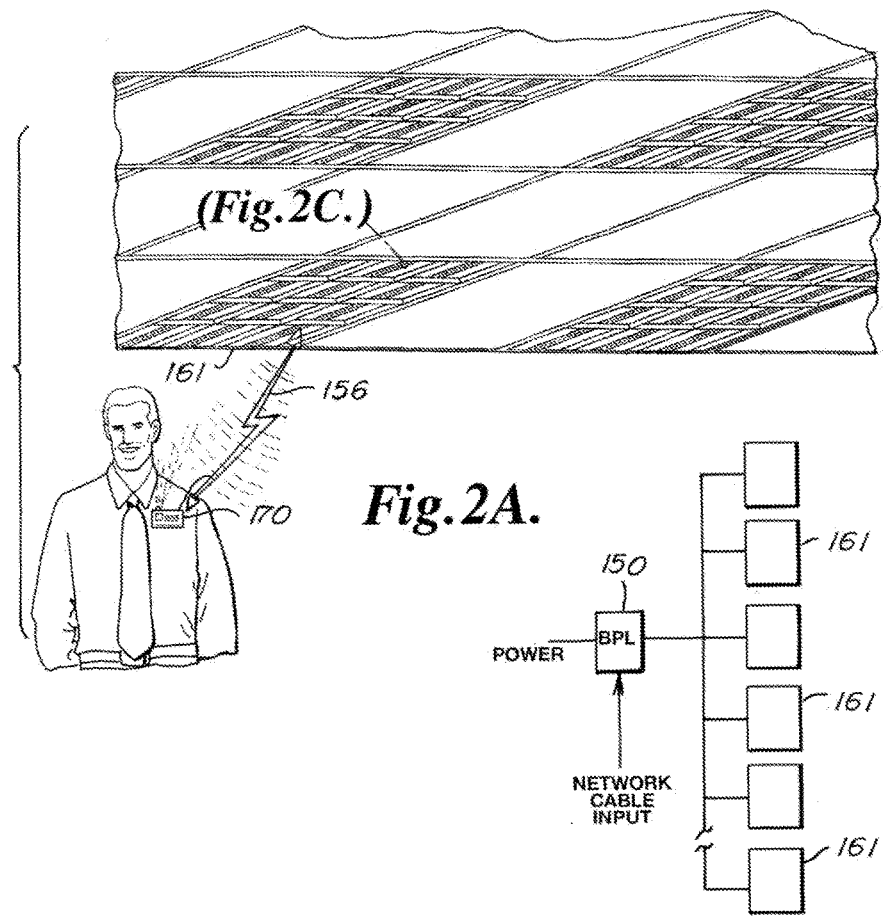
Fig. 2A.
Fig. 4.
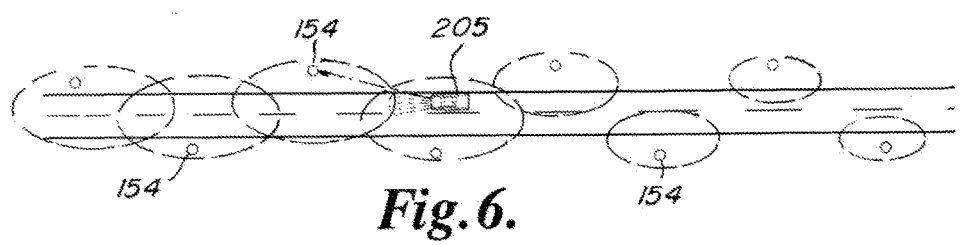
Fig. 6.

BUILDING ILLUMINATION APPARATUS WITH INTEGRATED COMMUNICATIONS, SECURITY AND ENERGY MANAGEMENT

CROSS-REFERENCE TO RELATED APPLICATIONS

This application is a continuation of application Ser. No. 14/288,917, filed May 28, 2014, now U.S. Pat. No. 9,461,740, issued Oct. 4, 2016, which is a continuation of application Ser. No. 13/427,358, filed Mar. 22, 2012, now U.S. Pat. No. 8,744,267, issued Jun. 3, 2014, which is a continuation of application Ser. No. 12/126,342, filed May 23, 2008, now abandoned, which claims priority to provisional patent application No. 60/931,611, filed May 24, 2007, the disclosure all of which is expressly incorporated herein by reference.

STATEMENT REGARDING FEDERALLY SPONSORED RESEARCH

Not Applicable

FIELD OF THE INVENTION

In some embodiments, the present invention is generally directed to light emitting diodes (LEDs) and applications thereof. In particular, some embodiments of the present invention are directed to using LEDs and power line communication technology to provide internet access and communication capability to residential and commercial clientele.

BACKGROUND OF THE INVENTION

Radiofrequency transmissions may be easily intercepted, in part because of the fact that RF signals are designed to radiate signals in all directions. Radiofrequency transmissions are also regulated by the Federal Communications Commission (FCC) which controls the frequencies that may be used by individuals. Radiofrequency transmissions are also susceptible to interference and produce noise.

In contrast to RF communications, light sources used for communication are extremely secure due to the fact that they are focused within a narrow beam, requiring placement of equipment within the beam itself for interception. Also, because the visible spectrum is not regulated by the FCC, light sources can be used for communications purposes without the need of a license. Light sources are also not susceptible to interference nor do they produce noise that can interfere with other devices.

Light emitting diodes (LEDs) may be used as light sources for data transmission, as described in U.S. Pat. Nos. 6,879,263 and 7,046,160, the entire contents of each being expressly incorporated herein by reference. LEDs have a quick response to "ON" and "OFF" signals, as compared to the longer warm-up and response times associated with fluorescent lighting, for example. LEDs are also efficient in producing light, as measured in lumens per watt. Recent developments in LED technology, such as high brightness blue LEDs, which in turn paved the way for white LEDs, have made LEDs a practical alternative to conventional light sources. As such, LED technology provides a practical opportunity to combine lighting and communication. This combination of lighting and communication allows ubiquitous light sources such as street lights, home lighting, and office building lighting, for example, to be converted to, or supplemented with, LED technology to provide for communications while simultaneously producing light for illumination purposes.

Regarding office buildings, building management is a complex science which incorporates and governs all facets of human, mechanical and structural systems associated with buildings. As a result of the complexity, most commercial buildings are managed by commercial property management companies with great expertise. Both at the time of construction and throughout the life-cycle of a building, the interrelationships between people and the mechanical and structural systems are most desirably evaluated. Where possible and cost-effective, human interactions with a building and associated mechanical systems will be optimized, in turn providing the greatest benefit to both the owners and those who use the facilities afforded by the building. Noteworthy is the fact that building users may include both regular occupants such as individual or commercial tenants, and also transient occupants such as visitors, guests, or commercial customers.

Building management includes diverse facets, some which are simply representations of the building and associated systems and people, and other facets which are tangible. Exemplary of representations are accounting or financial monitoring responsibilities which will including record keeping control and assurance of financial transactions involving tenants, owners, and service providers. Exemplary of the physical or tangible responsibilities are physical development and maintenance, including identification of need for features, improvements, maintenance and the assurance of the execution of the same. As is well understood by those highly versed in building management, the diverse responsibilities and extent of information required to manage a building is often quite overwhelming.

One very important area associated with building management is lighting or illumination. While often perceived as a simple task of providing lights, this seemingly simple task has much research and science behind a well-designed lighting system. This is because safety, productivity and general well-being of occupants depend heavily on proper lighting.

Many factors need considered at the time of construction or remodeling to facilitate proper lighting design. Intended usage of a space is important in illumination design consideration, since this will dictate necessary illumination levels, times and duration of use, and anticipated cycling of the illumination. In other words, a supply closet will not ordinarily be designed for around-the-clock illumination, and may instead be configured to operate on a switch. The use of appropriate switches helps to reduce the energy required for a building to function with occupants, and simultaneously increases the life of many illumination components such as light sources (light bulbs and equivalents thereto) since the light sources are only required intermittently. As another example, a room where movies, slides, computer or other visual or audio-visual presentations are given, such as a boardroom or classroom, will preferably have light controls such as separate switches or switches and dimmer controls which enable the entire room to be well lit or alternatively maintain a minimum level of illumination normally opposite to where the presentation is displayed. This minimum level of illumination enables occupants sufficient light for note-taking, safe movement and other important activities, without interfering with the legibility of a presentation. In yet another example, a primary work-space such as a desk or kitchen counter will require illumination that does not cast shadows on the work space while work is being performed.

Complementary illumination, such as windows or skylights, is also important in design consideration.

Nearly all public buildings rely on a great many lamps positioned throughout the interior of the building, such as along hall corridors and in each room, and also about the exterior. These lights have historically been activated manually. Architects are commonly employed to assist not only with a floor plan of physical spaces, but also with the proper selection and layout of lighting to best complement the floor plan and usage of each space within a building. As may be appreciated, illumination of a space is determined at the time of production of blueprints, in anticipation of construction. The illumination that has been chosen for a space is essentially fixed during building construction. Changes may be made later, but not without substantial additional expense that will, for exemplary purposes, often include removal of parts of or entire walls, with the accompanying disruption of the space. Often the space is unavailable for use during the entire duration of a remodeling project.

Further complicating the issue of illumination is the type of light bulb that may be most appropriate for a space or location. Original electric light bulbs were incandescent. With sufficient electrical energy, which is converted to heat within an incandescent bulb filament, the filament will emit visible light. This is similar to a fire, where with enough heat, visible light is produced. As might also be appreciated though, incandescent bulbs produce far more heat than light. The color of the light from these bulbs is also most commonly quite yellow, casting a warm hue at a color temperature typically in the vicinity of 3,000 degrees Kelvin. Warm hues are often prized in relaxed settings such as those of a living room or dining room, more closely resembling gentle candle light. However, in contrast thereto, work and study environments are more preferably illuminated with light of more blue content, more closely resembling daylight with color temperatures of approximately 6,000 degrees Kelvin. Daylight color temperatures are not practically obtained using an incandescent bulb. In addition, these incandescent bulbs have only a few thousand hour life expectancy, even with more than a century of improvements, because the extreme temperatures required for the filament to light also gradually evaporates the filament material. Finally, the thermal mass of the filament greatly influences how quickly the filament both illuminates and extinguishes. In spite of the many limitations, incandescent bulbs are still in fairly widespread use today.

An alternative to incandescent light bulbs in common use today is the fluorescent bulb. A fluorescent light bulb uses a small amount of mercury in vapor state. High voltage electricity is applied to the mercury gas, causing the gas to ionize and generate some visible light, but primarily Ultra-Violet (UV) light. UV light is harmful to humans, being the component that causes sun burns, so the UV component of the light must be converted into visible light. The inside of a fluorescent tube is coated with a phosphorescent material, which when exposed to ultraviolet light glows in the visible spectrum. This is similar to many glow-in-the-dark toys and other devices that incorporate phosphorescent materials. As a result, the illumination from a fluorescent light will continue for a significant time, even after electrical power is discontinued, which for the purposes of the present disclosure will be understood to be the latent period or latency between the change in power status and response by the phosphor. As the efficiencies and brightness of the phosphors has improved, so in many instances have the delays in illumination and extinguishing, or latency, increased. Through the selection of ones of many different modern phosphorescent coatings at the time of manufacture, fluorescent bulbs may manufactured that produce light from different parts of the spectrum, resulting in manufacturing control of the color temperature, or hue or warmness of a bulb.

The use of fluorescent bulbs, even though quite widespread, is controversial for several reasons. One source states that all pre-1979 light ballasts emit highly toxic Polychlorinated BiPhenyls (PCBs). Even if modern ballasts are used, fluorescent bulbs also contain a small but finite amount of mercury. Even very small amounts of mercury are sufficient to contaminate a property. Consequently, both the manufacture and disposal of mercury-containing fluorescent tubes is hazardous. Fluorescent lighting has also been alleged to cause chemical reactions in the brain and body that produce fatigue, depression, immuno-suppression, and reduced metabolism. Further, while the phosphor materials may be selected to provide hue or color control, this hue is fixed at the time of manufacture, and so is not easily changed to meet changing or differing needs for a given building space.

Other gaseous discharge bulbs such as halide, mercury or sodium vapor lamps have also been devised. Halide, mercury and sodium vapor lamps operate at higher temperatures and pressures, and so present undesirably greater fire hazards. In addition, these bulbs present a possibility of exposure to harmful radiation from undetected ruptured outer bulbs. Furthermore, mercury and sodium vapor lamps generally have very poor color-rendition-indices, meaning the light rendered by these bulbs is quite different from ordinary daylight, distorting human color perception. Yet another set of disadvantages has to do with the starting or lighting of these types of bulbs. Mercury and sodium vapor lamps both exhibit extremely slow starting times, often measured by many minutes. The in-rush currents during starting are also commonly large. Many of the prior art bulbs additionally produce significant and detrimental noise pollution, commonly in the form of a hum or buzz at the frequency of the power line alternating current. In some cases, such as fluorescent lights, ballasts change dimension due to magnetostrictive forces. Magnetic field leakage from the ballast may undesirably couple to adjacent conductive or ferromagnetic materials, resulting in magnetic forces as well. Both types of forces will generate undesirable sound. Additionally, in some cases a less-optimal bulb may also produce a buzzing sound.

When common light bulbs are incorporated into public and private facilities, the limitations of prior art bulb technologies often will adversely impact building occupants. As just one example, in one school the use of full-spectrum lamps in eight experimental classrooms decreased anxiety, depression, and inattention in students with SAD (Seasonal Affective Disorder). The connection between lighting and learning has been conclusively established by numerous additional studies. Mark Schneider, with the National Clearinghouse for Educational Facilities, declares that ability to perform requires "clean air, good light, and a quiet, comfortable, and safe learning environment." Unfortunately, the flaws in much of the existing lighting have been made worse as buildings have become bigger. The foregoing references to schools will be understood to be generally applicable to commercial and manufacturing environments as well, making even the selection of types of lights and color-rendition-indexes very important, again depending upon the intended use for a space. Once again, this selection will be fixed, either at the time of construction when a particular lighting fixture is installed, or at the time of bulb installation, either in a new fixture or with bulb replacements.

A second very important area associated with building management is energy management. The concern for energy management is driven by the expense associated with energy consumed over the life of a building. Energy management is quite challenging to design into a building, because many human variables come into play within different areas within a building structure. Considering the foregoing discussion of lighting, different occupants will have different preferences and habits. Some occupants may regularly forget to turn off lights when a space is no longer being occupied, thereby wasting electricity and diminishing the useful life of the light bulbs. In another instance, one occupant may require full illumination for that occupant to operate efficiently or safely within a space, while a second occupant might only require a small amount or local area of illumination. Further complicating the matter of energy management is the fact that many commercial establishments may have rates based upon peak usage. A business with a large number of lights that are controlled with a common switch may have peak demands large relative to total consumption of power, simply due to the relatively large amount of power that will rush in to the circuit. Breaking the circuit into several switches may not adequately address inrush current, since a user may switch more than one switch at a time, such as by sliding a hand across several switches at once. Additionally, during momentary or short-term power outages, the start-up of electrical devices by the power company is known to cause many problems, sometimes harming either customer equipment or power company devices. Control over inrush current is therefore very desirable, and not economically viable in the prior art.

Energy management also includes consideration for differences in temperature preferred by different occupants or for different activities. For exemplary purposes, an occupant of a first office space within a building may prefer a temperature close to 68 degrees Fahrenheit, while a different occupant in a second office space may prefer a temperature close to 78 degrees Fahrenheit. The first and second office spaces may even be the same office space, just at different times of day. For exemplary purposes, an employee working in a mail room from 8 a.m. until 4 p.m. may be replaced by a different mail room employee who works from 4 p.m. until 12 a.m. Heating, Ventilation, and Air Conditioning (HVAC) demand or need is dependent not only upon the desired temperature for a particular occupant, but also upon the number of occupants within a relatively limited space. In other words, a small room with many people will require more ventilation and less heating than that same room with only one occupant.

With careful facility design, considerable electrical and thermal energy can be saved. Proper management of electrical resources affects every industry, including both tenants and building owners. In many instances facility design has been limited to selection of very simple or basic switches, and thermostats, and particular lights, all fixed at the time of design, construction or installation.

A third very important area associated with building management is security. Continuing to use a school as but one example of a public building, a one-room country school fifty years ago was made up of one teacher who knew well the small number of pupils. Security consisted of a simple padlock on a wooden door. The several windows on one side of the room provided light. They were locked but almost never broken into, for nothing of major value, even during the Depression, enticed potential thieves.

Architecture changed as the years passed. Buildings were enlarged as school populations increased. Students started to conceal books, outerwear, valuables, and occasionally even weapons in enclosed lockers. Indoor lighting was required. Eventually as society became more hazardous, security had to be provided in many schools in the form of personnel who were required to patrol both outside and inside schools in order to provide a measure of safety.

In many public buildings, including schools, modern security presently screens a building's occupants to ensure that they belong or have proper authorization to enter the building. Security must also check for weapons, drugs, and even explosives. Thus, modern security personnel are often responsible for property as well as people. As the types of potential perils increase, so does the need for personnel, to process occupants through more and more stations. For exemplary purposes, in schools, airports, court houses, and other public facilities, one or more guards may check identification, admission badges or paperwork, while one or more other guards monitor metal detectors. One or more additional guards may be monitoring drug sniffing dogs or equipment, or spot checking bags. Unfortunately, the possibilities of duplication and/or forgery of credentials, or of hostile powers infiltrating security, or other criminal methods demonstrate the potential weaknesses of the present system, which depends upon a large number of security employees. Motion sensors and other prior art electronic security measures, while often beneficial, occasionally fail even when used in combination with security personnel to provide adequate protection. On the outside of a building, motion sensors may be activated by strong winds, stray animals, passing vehicles, or blowing debris. Inside, they operate only for a specific time; a room's occupant, if not moving about, may suddenly be in the dark and must re-activate the light by waving or flailing about.

An increasingly complex, and therefore hazardous, society requires increasingly extensive patrols and safeguards. Current security system, which must rely on increasing the numbers of guards and security devices, are subject to inherent defects and extraordinary expense, generally rendering them inadequate even with the best of intention.

Yet another very important area associated with building management is guidance control and indication, which impacts building security, as well as building convenience and efficiency for occupants. In buildings having many alternative hallways or paths, such as are commonly found in hospitals and other large public facilities, directions are often clumsy and difficult for visitors or emergency personnel to follow. Old-fashioned directories may be hard to locate or decipher, especially for non-English speakers or for persons with little or no time, again such as emergency personnel. Consequently, some buildings provide color stripes along walls that serve as color coding to guide visitors to various areas within the building. Unfortunately, the number of color stripes that may be patterned is quite limited, and the expense and defacing of appearance associated therewith is undesirable. Furthermore, such striping does not completely alleviate confusion, and the color stripes can only serve as general guides to commonly visited areas.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

This application is related to the patent application entitled "LED Light Communication System," U.S. patent application Ser. No. 12/126,529, filed May 23, 2008, which is incorporated by reference herein in its entirety. The present application is also related to the patent application entitled "LED Light Dongle Communication System," U.S. patent application Ser. No. 12/126,227, filed May 23, 2008, which is incorporated herein by reference in its entirety. Also the present application is related to the patent application entitled "LED Light Interior Room and Building Communication System," U.S. patent application Ser. No. 12/126,647, filed May 23, 2008, which is incorporated by reference herein it its entirety. Further the present application is also related to the patent application entitled "LED Light Broad Band Over Power Line Communication System," U.S. patent application Ser. No. 12/126,469, filed May 23, 2008, which is incorporated by reference herein in its entirety. The present application is also related to the patent application entitled "LED Light Global Positioning And Routing Communication System," U.S. patent application Ser. No. 12/126,589, filed May 23, 2008, which is incorporated by reference in its entirety.

Applicant additionally incorporates by reference herein patent application Ser. No. 10/646,853, filed Aug. 22, 2003, which claims the benefit of provisional patent application No. 60/405,592 and 60/405,379, both filed Aug. 23, 2002, the disclosures of all three being expressly incorporated herein by reference. Further, Applicant incorporates by reference herein patent application Ser. No. 12/032,908, filed Feb. 18, 2008, which is continuation of patent application Ser. No. 11/433,979, filed May 15, 2006, which is a continuation of patent application Ser. No. 11/102,989, filed Apr. 11, 2005, now issued U.S. Pat. No. 7,046,160, which is a division of patent application Ser. No. 09/993,040, filed Nov. 14, 2001, now issued U.S. Pat. No. 6,879,263, which claims the benefit of provisional patent application No. 60/248,894, filed Nov. 15, 2000, the entire contents of each being expressly incorporated herein by reference.

According to the invention, there is provided a light emitting diode (LED) signal light and systematic information transfer through encrypted pulsed light communication system which may be depicted in several embodiments. In general, the signal light and pulsed light communication system may be formed of a single row, single source, or an array of light emitting diode light sources configured on a light support and in electrical communication with a controller and a power supply, battery, or other electrical source. The signal light and pulsed light communication system may provide various light signals, colored light signals, or combination or patterns of light signals for use in association with the communication of information. These light signals may also be encoded. Additionally, the signal light and pulsed light communication system may be capable of displaying symbols, characters, or arrows. Rotating and oscillating light signals may be produced by sequentially illuminating columns of LED's on a stationary light support in combination with the provision of variable light intensity from the controller. However, the signal light and pulsed light communication system may also be rotated or oscillated via mechanical means. The signal light and pulsed light communication system may also be easily transportable and may be conveniently connected to a stand such as a tripod for electrical coupling to a power supply, battery, or other electrical source as a remote stand-alone signaling or communication device.

The signal light and pulsed light communication system may be electrically coupled to a controller used to modulate, pulse, or encode, the light generated from the light sources to provide for various patterns or types of illumination to transmit messages.

Individual light supports as a portion of the communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LED's, to regulate or modulate the light intensity for the LED light sources. The individual LED's and/or arrays of LED's may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

BRIEF DESCRIPTION OF THE DRAWINGS

FIG. 2A is an environmental view of an alternative embodiment of the Communication System.

FIG. 4 is a block diagram of an alternative embodiment of the Communication System.

FIG. 6 is an environmental view of an alternative embodiment of the Communication System.

DETAILED DESCRIPTION OF THE PREFERRED EMBODIMENTS

Figure 1:
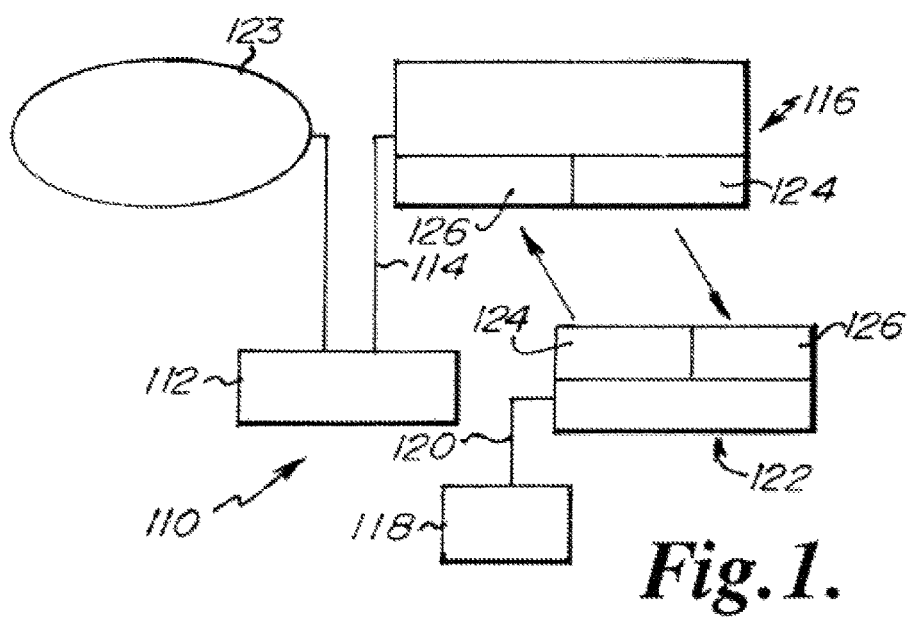
FIG. 1 is a block diagram of one embodiment of the Communication System.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In each of the embodiments discussed below, the LEDs may be formed of the same or different colors. The controller may be configured to select the color of the LEDs to be illuminated forming the light signal.

FIG. 1 depicts an exemplary embodiment 110 of an LED light and communication system. FIG. 1 shows a server PC 112 connected via a USB cable 114 to a server optical transceiver (XCVR) 116, and a client PC 118 connected via a USB cable 120 to a client optical transceiver 122. The server PC 112 is in communication with a network 123 via a CAT-5 cable, for example. The server optical XCVR and the client optical XCVR are substantially similar in at least one embodiment. An exemplary optical XCVR (or, simply, "XCVR") circuit includes one or more LEDs 124 for transmission of light and one or more photodetectors 126 for receiving transmitted light. LEDs and photodetectors are well known to those of ordinary skill in the art and, as such, their specific operation will not be described in detail. The term "photodetector" includes "photodiodes" and all other devices capable of converting light into current or voltage. The terms photodetector and photodiode are used interchangeably hereafter. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module drives the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC, 3 amp power supply is sufficient for powering an array of high intensity LEDs.

In some embodiments, the XCVR circuit further includes an amplifier for amplifying the optical signal received by the photodiode. The output of the amplifier may be fed into level shifting circuitry to raise the signal to TTL levels, for example. The signal is then fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery can reduce these noise problems by reducing or removing transients.

It should be noted that in some embodiments, the LED can both emit and receive light. In such an embodiment, the LED can act both as a transmitter or receiver. More information on such bi-directional LEDs can be found in U.S. Pat. No. 7,072,587, the entire contents of which are expressly incorporated herein by reference.

In at least one embodiment, the optical XCVRs, or circuitry attached thereto, include modulation circuitry for modulating a carrier signal with the optical signal. Modulation can be used to eliminate bias conditions caused by sunlight or other interfering light sources. Digital modulation can be accomplished by using phase-shift keying, amplitude-shift keying, frequency-shift keying, quadrature modulation, or any other digital modulation technique known by those of ordinary skill. Similarly, such XCVRs can include demodulation circuitry that extracts the data from the received signal. Modulation and demodulation techniques for modulating light signals are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal can be modulated at 100 kHz and then transmitted. The XCVR that receives the 100 kHz modulated signal can include a filter stage centered at 100 kHz. The filtered 100 kHz signal can then be input into the amplifier circuitry, thereby preventing amplification of unwanted signals. In some embodiments, it can be desirable to amplify the transmitted signal first, and then filter out the baseband signal.

Additional information regarding data communication can be found in International Publication Number WO 99/49435, the entire contents of which are expressly incorporated herein by reference.

In another embodiment of the present invention, security badges, ID badges, communications badge, badge, or name tags, these terms being used interchangeably hereafter, can include optical XCVRs, as shown in FIG. 2A. The optical XCVR of a user's security badge 170 communicates with the optical XCVRs 160 that are also acting as room lighting, hall lighting, or other lighting 161 in a customer's facility, as shown in FIG. 2A. Of course, the optical XCVRs can be placed in numerous other locations as lighting sources. Using the XCVRs as light sources can reduce energy consumption and simplify communications by reducing the filtering or modulation complexities necessary to distinguish data signals from extraneous lighting sources. As shown in FIG. 2A, a user is shown with a name tag 170 that is broadcasting and receiving data over an optical link 156 using the XCVR described in FIG. 2A to a ceiling mounted fixture. Badge 170 is pinned to, affixed with or otherwise transported by a person, in the embodiment as illustrated as a replacement for standard security identification badges.

Figure 2C:
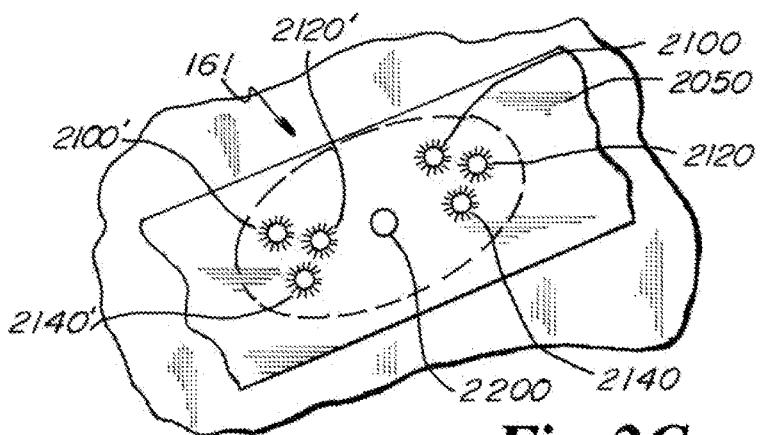
FIG. 2C is a detailed view of an LED light source in any exemplary embodiment of the present invention.
Figure 2B:
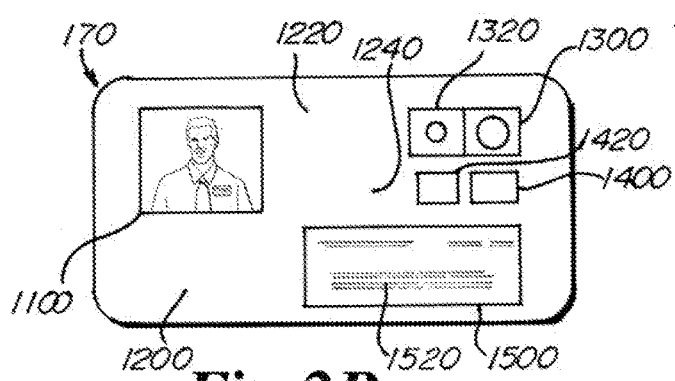
FIG. 2B is a detailed view of a name tag in an exemplary embodiment of the present invention.

Badge 170 is illustrated in greater detail in FIG. 2B, and may include features commonly found in standard security identification badges, including but not limited to such attributes as a photograph 1100 of the person assigned to the badge, and indicia such as employee identification or number 1200, name 1220, and business or entity logos 1240. Business or entity logos 1240, or other components may integrate anti-counterfeiting technology as may be available or known for such diverse applications as passports, driver's licenses, currency and other applications. Commonly used devices include holograms, watermarks, special materials or unique threads, and embedded non-alterable electronic, visible, sonic or other identification codes. An optical transmitter 1300 and receiver 1320 are most preferably provided and enable communication over optical communications channel 156. A microphone, loudspeaker, microphone and speaker combination, or dual-purpose device 1400 may be provided to integrate an auditory communication channel between communication badge 170 and nearby living beings or other animate or inanimate objects. A video camera 1420 may be incorporated to capture video or still pictures. A video display 1500 may additionally be incorporated into communication badge 170, permitting information 1520 to be displayed thereon, which could for exemplary purposes could comprise either text or graphics.

Depending upon the intended application for which communication badge 170 is being designed, to include such ordinary factors as cost and desired features, and also upon the size of communication badge 170 and available video resolution within video display 1500, photograph 1100 may in some cases be eliminated and replaced entirely by an electronic representation displayed within video display 1500 either continuously or upon request or polling. Similarly, indicia such as employee identification or number 1200, name 1220, and business or entity logos 1240 may also be provided either as illustrated in FIG. 2B, or in another embodiment solely upon video display 1500.

Biometric detectors and systems may be employed within or in association with communication badge 170. For exemplary purposes, but not limited solely thereto, a fingerprint reader or other biometric detector may be incorporated within badge 170. In such case, periodic or action-driven re-activation may be required to verify that badge 170 is still in proper possession of the person assigned therewith. For exemplary purposes, when a particularly sensitive area is being accessed, or a building first entered, the security system in accord with an embodiment of the present invention may communicate through badge 170 to person and require a fingerprint verification scan. Other biometric indicators may not require active confirmation, and more than one biometric indicator may be incorporated herein.

Communication badge 170 communicates with XCVR 160 in LED light source 161. LED light source 161, illustrated by magnified view in FIG. 2C as a body 2050 that incorporates at least one, and preferably a plurality of LEDs and optical detectors. One or more photodetectors 2200 may be provided, and may either be broad spectrum detectors or alternatively color-filtered or sensitive to only a single color. The detector will be any of the myriad known in the art, the particular selection which will be determined by well-known considerations such as sensitivity, reliability, availability, cost and the like.

As illustrated, LEDs are in clusters of three. In accord with the present invention, these LEDs are RGB LEDs, designating that they include red, blue and green which are the primary additive colors from which all other colors including white may be produced. For exemplary purposes only, LED 2100 may generate red light, commonly of approximately 650 nanometer wavelength, LED 2120 may generate blue light, commonly of approximately 475 nanometer wavelength, and LED 2140 may generate green light, commonly of approximately 565 nanometer wavelength. LEDs 2100-2140 may be discrete components, or may alternatively be integrated onto a common die and take the physical form of a single LED. Furthermore, more than one RGB LED may be integrated upon a single die or within a common package, as may be deemed most appropriate by a manufacturer. A plurality of RGB LEDs may also be provided upon or within a single body 2050, as illustrated in FIG. 2C by RGB LEDs 2100', 2120' and 2140'. In practice, there is no limit to the number of RGB LEDs that may be used, other than physical size and available space limitations, and thermal dissipation capacity and power requirement constraints.

By controlling the relative power applied to each one of the RGB LEDs 2100-2140, different colors may be produced. This concept is well-known as the RGB model, and is used today in nearly all video displays. Color televisions and computer monitors, for example, incorporate very small red, green and blue (RGB) dots adjacent to each other. To produce white regions on the screen, all three RGB dots are illuminated. Black dots are the result of none of the RGB dots being illuminated. Other colors are produced by illuminating one or more of the dots at different relative levels, or alternatively controlling how many closely adjacent dots of one primary color are fully illuminated relatively to the other two primary colors.

Through the use of RGB LEDs, color temperature of an LED light panel 2000 may be adjusted or controlled, and may be varied in real time without making any hardware or apparatus changes. Instead, power applied to the RGB LEDs is adjusted to favor one or another of the RGB LEDs 2100-2140. Since the light emitted from the RGB LEDs is approximately full-spectrum light, the color-rendering index may also be relatively high, particularly when compared to mercury or sodium vapor lamps, making the light feel very natural.

While human eyes are substantially more tolerant of visible light, and while visible light intensity is readily discerned by humans, there is some description in the prior art of potential hazards associated with extreme intensity blue-wavelength illumination. In an embodiment of the invention, safeguards may be programmed or designed into the control of RGB LEDs 2100-2140 to prevent occurrence of conditions that could lead to blue-light hazard or other safety hazard that might potentially exist.

While other options exist for producing white light from LEDs, the use of an RGB LED absent of phosphors is preferred for most applications of the present invention. Not only is color of the light easily controlled using well-known RGB technology, but also by their very nature phosphors tend to slow down the rate at which an LED may be illuminated and extinguished due to phosphor latencies. For the purposes of the present invention, where an optical communications channel 156 is created between XCVR 161 and one or more communications badges 170, higher data transfer rates may be obtained with more rapid control of illumination levels. Consequently, if phosphors are used in the generation of light from LED light source 161, and if faster data exchange rates through optical communications channel 156 are desired, these phosphors will preferably be very fast lighting and extinguishing.

A variety of physical and electrical configurations are contemplated herein for LED light source 161. As illustrated in FIG. 2A, light source 161 may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to provide adequate replacement of wires, the voltage may be generated in transformers that may even be provided outside of the occupied space, such as on the roof, in a utility room, basement or attic. In addition to other benefit, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120 VAC at 60 Hertz in the United States, may pass through the electrical connector pins. LED base 2050, in such case, may be designed to insert directly into a standard fluorescent socket, such as, for exemplary purposes only and not limited thereto, the standard T8 and T12 sockets used in the United States. In such case, either RGB LEDs 2100-2140 are arranged and wired to directly operate from line voltage, or appropriate electronics will need to be provided directly in LED base 2050 to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

For LED light source 161 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through optical communication channel 156.

In accord with a preferred method of the invention, LEDs are used to transmit through optical communication channel several kinds of data, including identity, location, audio and video information. The use of an optical communications link provides large available bandwidth, which in turn permits multiple feeds of personal communication between LED light sources and badges similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of a badge and associated person can be discerned to a particular room, hallway or other similar space.

In contrast, prior art GPS systems and cell phone triangulation techniques are typically only accurate to one or several hundred feet. Horizontally, this prior art precision is adequate for many applications. However, vertically several hundred feet could encompass twenty floors in an office or apartment building. The preferred embodiment, capable of precision to a room or light fixture, therefore has much more exact pinpointing than hitherto available. It can locate a person immediately, even in a large area and/or among a large crowd, and can keep track of a large population simultaneously. As noted, the large bandwidth permits video signals to be integrated with badge location and movement, providing the opportunity to create audio-video records that are fixed in time and location.

Since location may be relatively precisely discerned, optical transmitter 1300 or LEDs 2100-2140 of FIG. 2B may in one embodiment be configured to change color, flash, or otherwise be visually changed or manipulated to assist with directional guidance, personnel or intruder identification, energy management, or to facilitate the meeting and connection of individuals. To achieve these objectives, a building needs to be wired only for lights, saving a huge infrastructure of other wires and fixtures.

Figure 3:
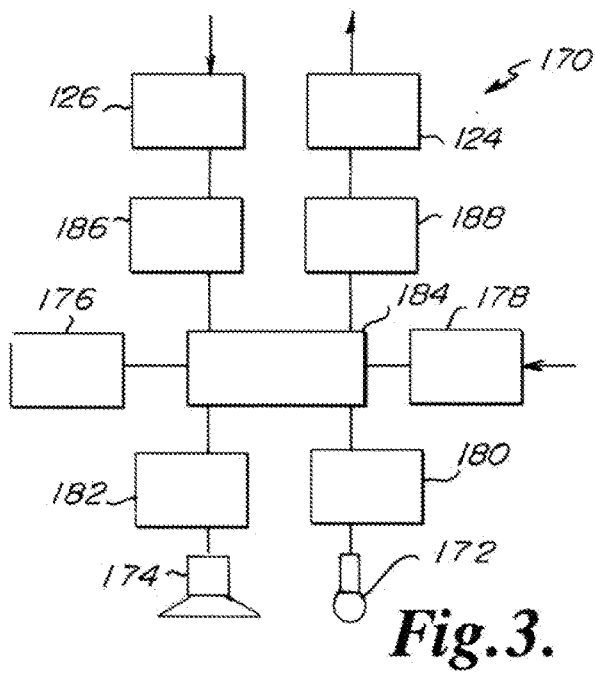
FIG. 3 is a block diagram of an alternative embodiment of the Communication System.

Some embodiments of the name tag 70 XCVR include any or all of the following devices: a microphone 172, a speaker 174, a rechargeable battery 176, and a video camera 178, as shown in the simplified block diagram of FIG. 3. In at least one embodiment, the microphone is in communication with an analog-to-digital converter (ADC)(not shown) for converting the analog speech input to a digital signal. An amplifier circuit 180 can be used to boost the microphone signal. The signal can be amplified prior to or after the ADC. In some embodiments, the speaker is communication with a digital-to-analog converter (DAC)(not shown) for converting the received digital signal to an analog output. An amplifier circuit 182 can be used to boost the speaker signal. The signal can be amplified prior to or after the DAC. The processor 184 shown in FIG. 3 converts the digital signals from the microphone/amplifier to data packets that can be used for transmission by the optical XCVR. Similarly, the processor converts the data packets received by the optical XCVR to audio out signals directed to the speaker. The processor can convert data packets received from or directed to the video camera. The term "processor" as used herein refers to a processor, controller, microprocessor, microcontroller, or any other device that can execute instructions, perform arithmetic and logic functions, access and write to memory, interface with peripheral devices, etc.

In such an embodiment, the user can use the name tag as a communication device. Alternatively, the user may use the name tag to stream music, or video if a display is included. Furthermore, the optical XCVR can also include non-volatile memory (FLASHRAM, EEPROM, and EPROM, for example) that can store firmware for the optical XCVR, as well as text information, audio signals, video signals, contact information for other users, etc., as is common with current cell phones. While a hard-drive may be used instead of these semiconductor-based memory devices, hard-drives may be impractical in some embodiments based on their size, access times, as well as their susceptibility to jarring.

The optical XCVR includes one or more photodetectors 126 for receiving transmitted LED or other light signals, and one or more LEDs 124 for transmitting LED signals, as shown in FIG. 3. In some embodiments, an optical signal amplifier 186 is in communication with the photodetectors to increase the signal strength of the received light signals. In at least one embodiment, the LEDs are in operative communication with an LED power driver 188, ensuring a constant current source for the LEDs.

In some embodiments, the name tag may include circuitry that performs modulation, demodulation, data compression, data decompression, up converting, down converting, coding, interleaving, pulse shaping, and other communication and signal processing techniques, as are known by those of ordinary skill in the art.

In at least one embodiment, the name tag of FIG. 2B is embedded with a unique code, similar in principle to the MAC address of a computer, for example. Thus, every name tag has a unique identifier. The name tag broadcasts the unique code at regular intervals, or irregular intervals if desired. Optical XCVRs located within the user's building and near the user can then receive the unique code transmitted by the name tag.

There are numerous applications of such a design. For example, in some embodiments, an optical XCVR is engaged to a door lock. When a user with a name tag approaches a locked door, the name tag broadcasts the unique code, and an optical XCVR in communication with the door lock receives the code, and if acceptable, unlocks or opens the door. A table of acceptable codes may be stored in a memory device that is in communication with, and accessible by, the door's optical XCVR. Alternatively, the door's optical XCVR may transmit a code to a central station which compares the user's code against a table of approved codes and then sends a response either allowing or denying access.

As seen in FIG. 4, the electrical wiring in the hallways and/or rooms may include BOPL. As such, the name tag may be used to provide access to the Internet via the optical XCVRs in the hallways and rooms. A person walking down the hallway may receive a phone call on their name tag from a person on the other side of the world as long as the other person was using the Internet to communicate and knew the unique code of the name tag. Such communication is possible because the Internet is based upon transmission of packetized data, a form ideally suited for use with an optical XCVR.

FIG. 4 illustrates a simplified block schematic diagram of an electrical circuit used to couple power and data to one or a plurality of LED light sources 161. Power, which may be either AC or DC current is coupled through a power line bridge 150 with data from a network cable input, for example. The source of the data is not critical to the operation of the present invention, but may include various computer outputs such as might, for exemplary purposes, include control processor output or network connections such as commonly found on Local Area Networks (LAN), Wide Area Networks (WAN) or through the Internet. In accord with one embodiment, the wiring between power line bridge 150 and LED light source 161 is shielded by passing through a conduit or the like, defining a Shielded Broadband-over-Power-Line (S-BPL) connection that is both resistant to interfering communications and also produces almost no radiant energy.

Figure 5:
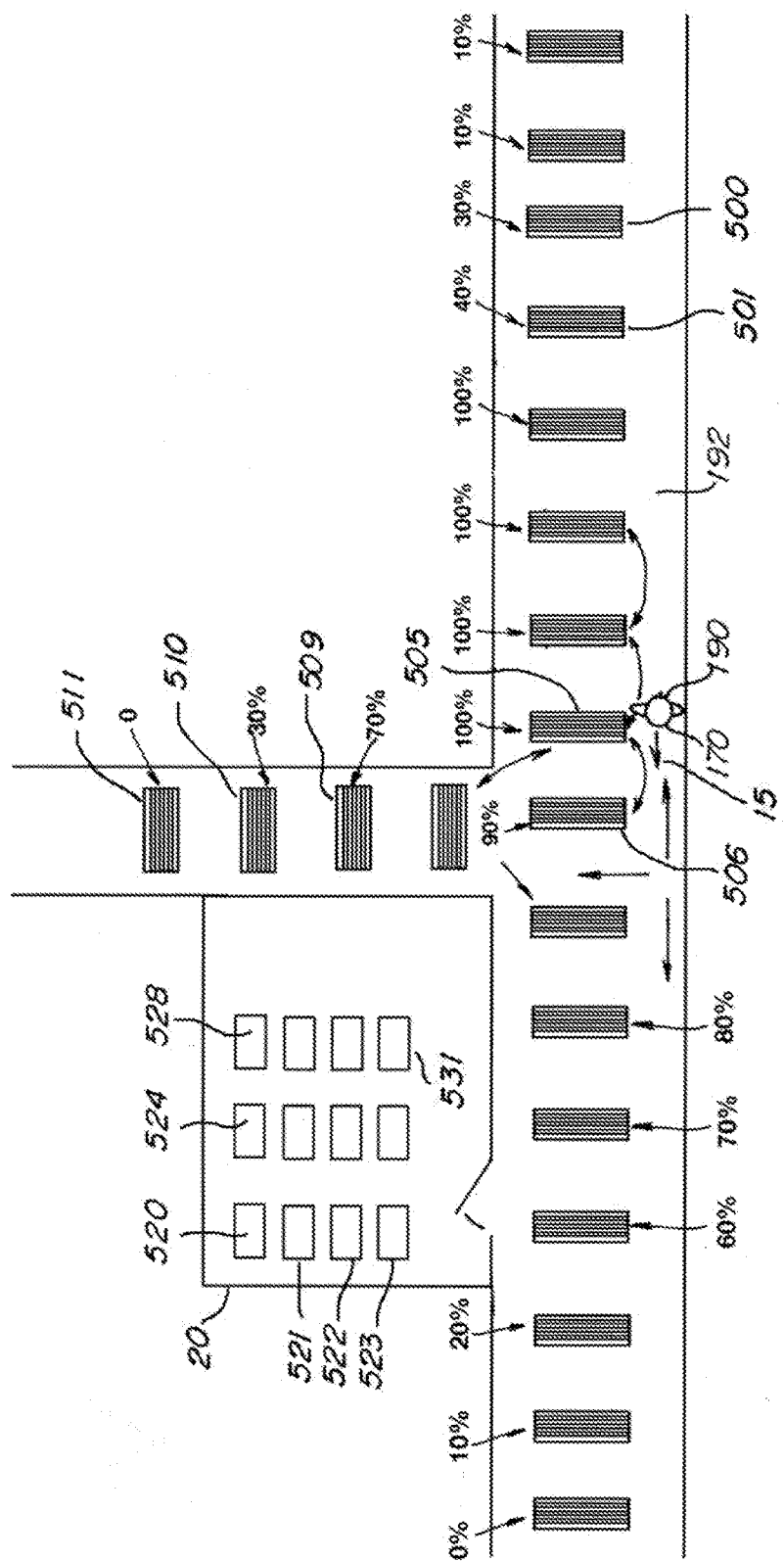
FIG. 5 is a block diagram of an alternative embodiment of the Communication System.
Figure 7:
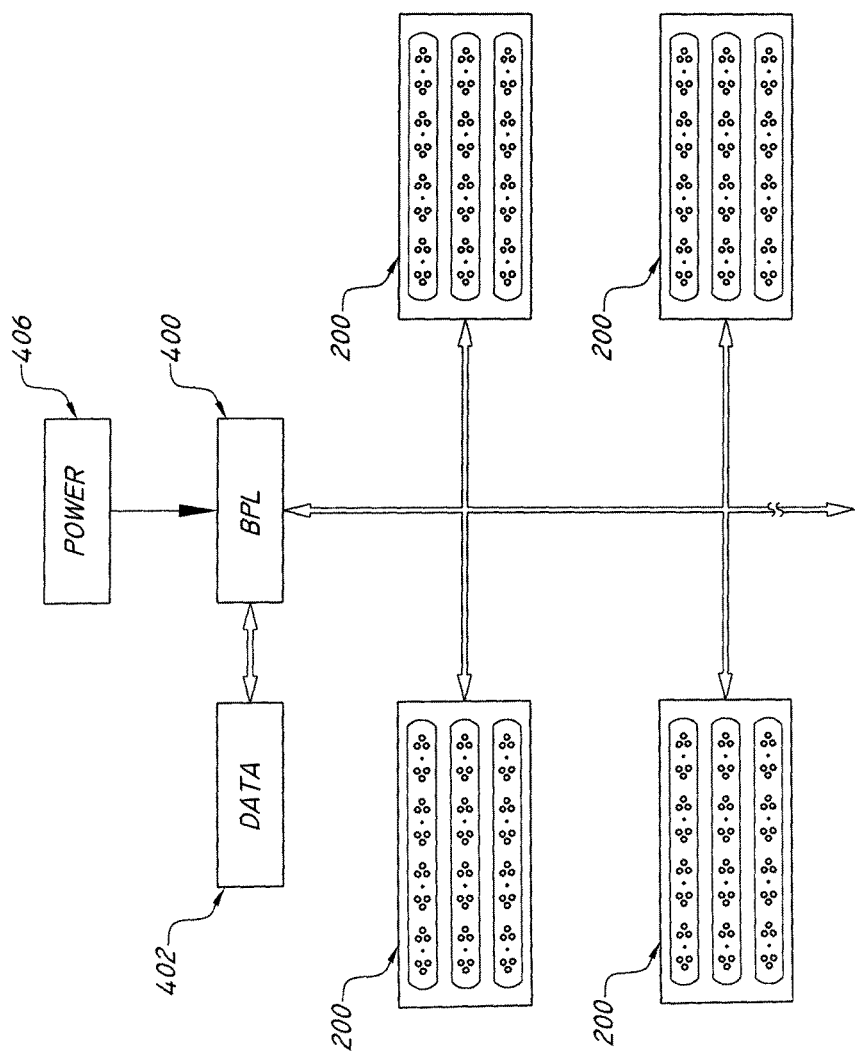
FIG. 7 is a block diagram of an alternative embodiment of the LED Communication System, depicting light sources in communication with a broadband over power line service.
Figure 8:
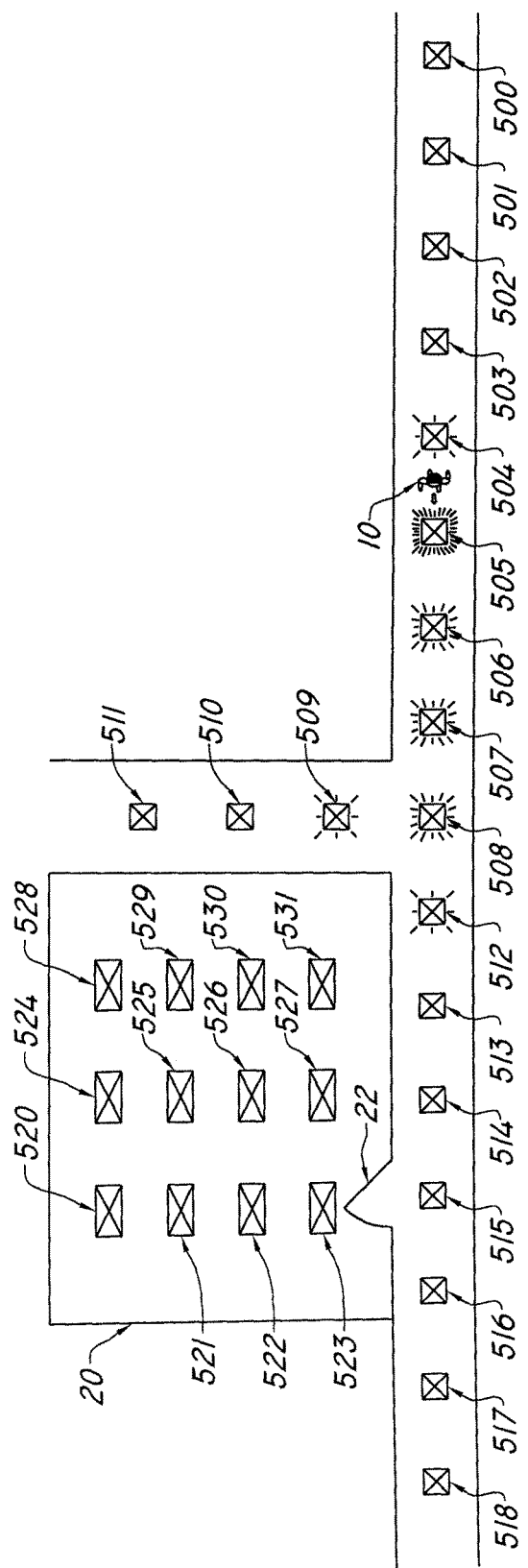
FIG. 8 is a block diagram of an alternative embodiment of the LED Communication System, depicting an energy management scheme.
Figure 9:
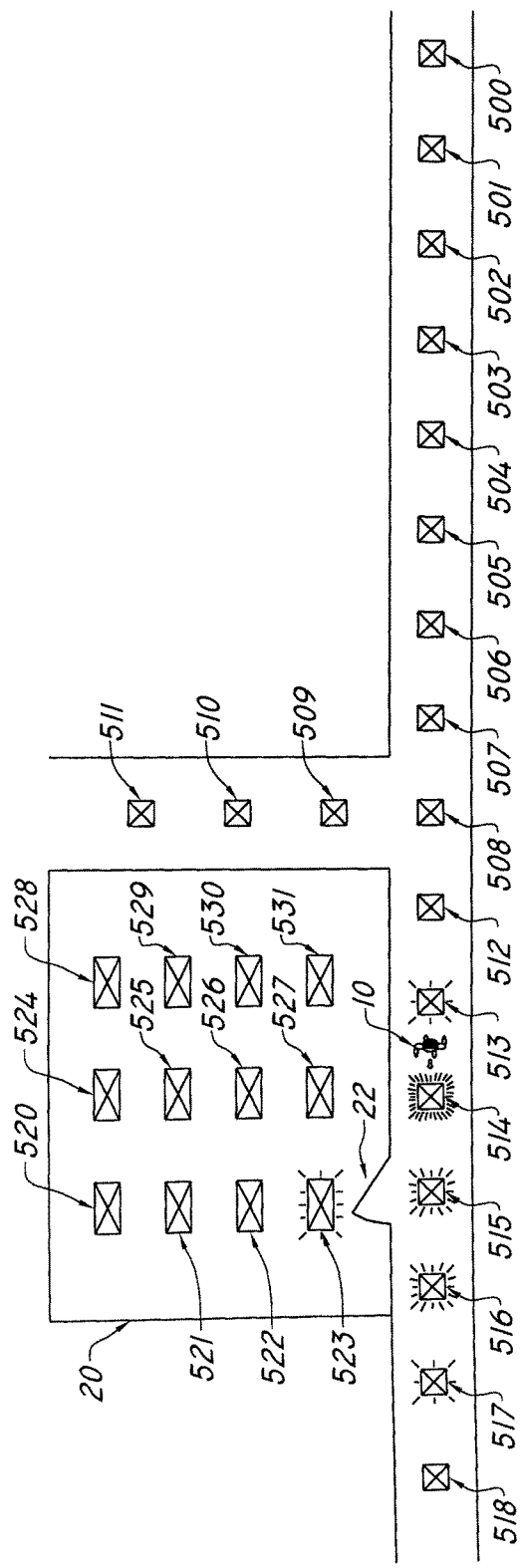
FIG. 9 is a block diagram of an alternative embodiment of the LED Communication System, depicting an energy management scheme.
Figure 10:
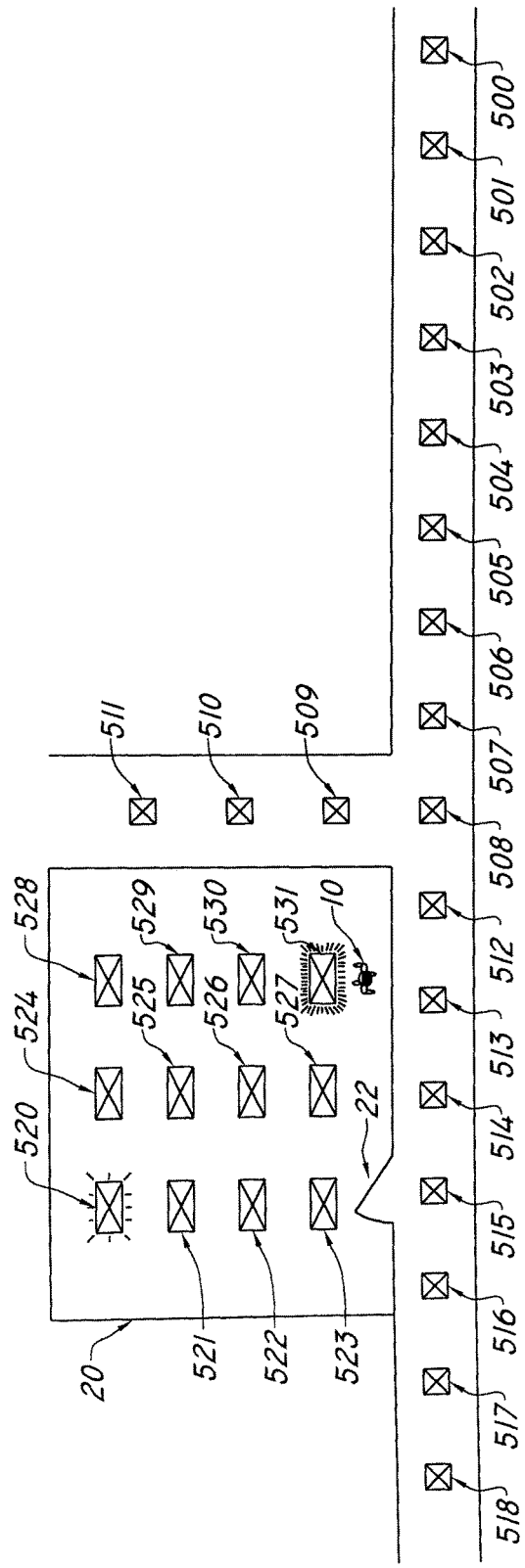
FIG. 10 is a block diagram of an alternative embodiment of the LED Communication System, depicting an energy management scheme.
Figure 11:
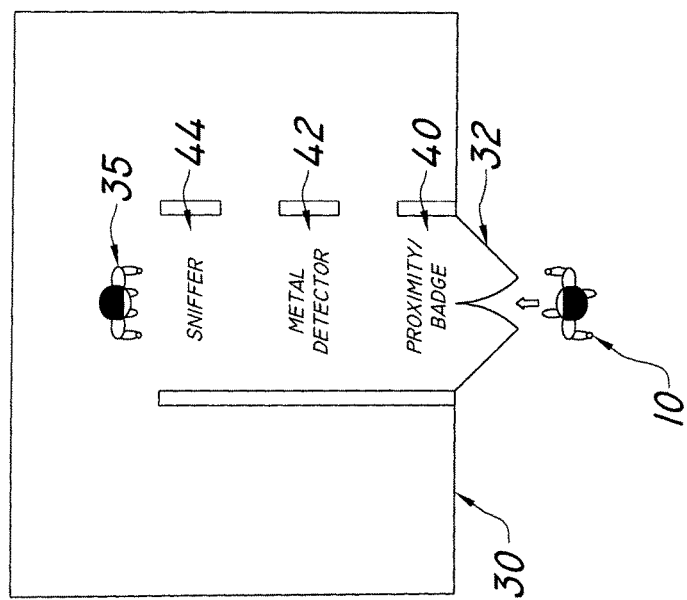
FIG. 11 is a pictorial representation of an alternative embodiment of the LED Communication System, depicting an exemplary security screening process.

In at least one embodiment, the name tag may be used in conjunction with the LED lighting in hallways, rooms, etc. to reduce energy consumption, as shown in FIG. 5. For example, all the lights in a hallway may have a standby setting such that they are relatively dim or even off. As a person with a name tag proceeds down a hallway, the lights in front of the person turn on in response to a transmitted signal (e.g. the unique code of the name tag). As the person moves beyond a light, the light returns to its standby setting of dim/off brightness through a signal communicated from a XCVR at a sufficiently remote location to include that the individual has passed, and is no longer present at this particular location. The presence of an individual proximate to an XCVR may be determined by either recognition of a signal or through the failure to continue to recognize a signal or by a proximity calculation as based on a controller receiving a signal from a remote location which indicates recognition of a name tag. A proximity is then calculated where initial or previous XCVR light sources are extinguished as an individual passes a particular location. In other embodiments, the lights can gradually become brighter, as a percentage of full brightness, as a person approaches, and then gradually dim, as a percentage of full brightness, as a person moves away based on proximity calculation as earlier described.

The lights shown in FIG. 5, in accordance with an embodiment of the invention, will have AC wiring with data carriers such as S-BPL, and static locations encoded into the system. Thus a person 190 entering a hallway 192 with a communications badge 170 could use only those lights needed for his travel. As the person progresses toward a destination, the lights behind may be no longer needed and so may be programmed to turn off. These lights could function variably from 10 to 100% as needed, for example. As shown in FIG. 5, the person 190 is approximately adjacent to light 505 and traveling in the direction shown by arrow 15 towards light 506. From this position, person 190 might prefer to be able to see into the branching corridor containing lights 509-511. With appropriate central computer control and programming which will be readily understood and achieved by those skilled in the computer arts, the illumination of these neighboring lights can be increased, to provide sufficient illumination to ensure the safety of person 190. Since different persons will have different desires regarding the extent of adjacent illumination, an embodiment of the present invention may incorporate custom programming of such features by individual person 190, or within standard preset selections, such as "cautious" where a relatively large number of lights are illuminated adjacent to person 190, or "carefree," where only a minimum number of lights are illuminated. Again, the level of illumination may additionally vary with relation to the person, the geometry of the building space, in accord with personal preferences, or for other reasons.

When person 190 has traveled farther, lights 509-511 may be extinguished, in effect providing a moving "bubble" of illumination surrounding person. Other lights are automatically shut-off or dimmed as desired and controlled by program. As FIG. 5 illustrates, lights within room 20 may similarly be activated and controlled, so for exemplary purposes as illustrated, light 531 may be at full intensity, lights 521-530 may be extinguished completely, and light 520 may be operating in a greatly dimmed state, but still providing adequate lighting to ease person 190.

The present invention reduces the extent of human interaction required to control various functions such as light switches and thermostats, while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements for optimal physiological and/or psychological effects and benefits.

Energy management is not solely limited to total power consumption. Peak inrush current is also an important factor monitored by many utility companies. This is the peak power draw of the power customer, for exemplary purposes within each twenty-four hour period. By controlling the timing of illumination and other equipment start-up, electrical draw may be gradually ramped up. Many devices initially draw more power at start-up than when operational. So, since each light is individually addressed and controlled and appliances or machines may similarly be controlled, the communications afforded by the present invention permit much smaller banks of devices to be started, allowing those devices to surge and then settle to lower energy requirements before starting the next bank of devices. Some devices and machines very quickly drop down to lower power draw. LED light sources are such a device. Banks of these may very quickly and sequentially be started. Other devices, such as electrical compressors found in heat pumps, refrigeration and air conditioning units, may require much more time for start-up, before additional devices should be started. Likewise, the particular order of start-up may be optimized for the various electrical loads found within a building. All of this is readily accomplished through simple programming and communication through preferred LED light sources or equivalents thereto.

Such embodiments are an improvement over conventional motion detectors, due to the "smart" nature of the optical XCVRs. Rather than waiting for a time delay as is the case with motion detectors, the optical XCVRs (and in some embodiments the optical XCVRs in conjunction with software) in the lighting fixture recognize immediately that the person has moved beyond a particular light, allowing that particular light to be dimmed or turned off. Also, this smart technology may be used to turn lights on only for people with the correct code embedded in their name tag. In such an embodiment, the user can walk into a restricted area, and if not authorized to be there, the lights would remain off, and if authorized the lights would turn on. Alternatively, a teacher with a name tag grading papers in a classroom, for example, may use the name tag to turn only the lighting near the teacher's desk at full brightness, while other lighting in the room remains at a dimmer, more energy efficient, setting.

In other embodiments of the invention, numbers of occupants within a space may be used not only for anticipating illumination, but also to control operation of other appliances and machinery within the building. Exemplary of this, but not limited thereto, are water and space heaters and coolers, and all other electrical or electrically controllable devices.

In some embodiments, the name tag may be used to assist emergency personnel. For example, if a person with a name tag had an incapacitating emergency condition while walking along a hallway in a building with optical XCVRs, as in the embodiments described above, the hallway lighting can be modified to direct emergency workers directly to the injured person. The lights can be made to flash, change color, or form directional arrows, or sequential directional indicators, or otherwise signify to the emergency personnel the quickest path to the person.

In addition to energy management, some embodiment of the present invention are directed towards security and detection of intruders. In the event of an intruder, the present preferred apparatus may be used to detect and locate the intruder. Since the building is dark, in many cases an intruder will rely upon a flashlight to move through the building. Most preferably, the XCVR will detect this unidentified light source. Optionally, an attempt will be made through the XCVR to communicate with the unidentified light source. A failure to communicate will indicate an intruder or unauthorized access. In such case, since the location of XCVR is known precisely, the location of the intruder is also known. Further, even as the intruder moves about, so the intruder will be tracked by virtue of the light emitting from the intruder's flashlight. When emergency personnel are called to the building, lights may be used to guide the emergency personnel to the exact location of the intruder. The emergency personnel may not be limited to police. As may by now be apparent, ambulance workers as well as police would appreciate flashing directional lights because quicker access to an emergency scene could potentially save lives. This custom guidance system can include red, white or other suitably colored or illuminated lights which may be steady or flashing for emergency situations. Corridor lights and/or individual communication badges may be equipped to flash, directing emergency personnel to a desired location or person.

In a further embodiment of the invention, communication badge may communicate with prior art screening equipment, such as metal detectors, x-ray machines, drug and explosives sniffers, and other such hardware. A building employing the present invention may incorporate multiple safety features. Instead of relying on several security guards at several stations to read badges and monitor each station, a proximity detector may first detect whether a person is passing through the entrance. If so, the adjacent LED light source will query for an appropriate or legitimate communications badge. Even if detected, if a badge has been duplicated, preferred logging and verification through software will instantly identify that the first person is already in the building. Consequently, the presently entering person and person already in the building can both be located, and the intruder identified. As discussed herein above, biometrics may additionally be incorporated, and for exemplary purposes a fingerprint scan or the like may be required to verify identity prior to passing through proximity/badge detector.

Once a valid badge has been detected, a person will continue through as many additional security checks as may be deemed appropriate, such as a metal detector and drug/explosive sniffer. Rather than requiring the traditional operator for each station, a single guard will in accordance with the present teachings often be adequate, so long as appropriate back-up is available on short notice. Because this energy management system requires far fewer human monitors, it provides additional cost saving. A guard would be needed primarily to respond if an alarm were present without having to identify several situations. A guard might be stationed only near a metal detector, for example, without having to monitor other stations. In addition, a more accurate inventory of persons, other assets, or substances in a building becomes possible. An important safety feature, however, is the greater reliability of electronics over personal vigilance.

The present invention also has the capacity to provide low power communications for energy management, emergency back-up, security and special applications utilizing alternative power sources such as batteries or solar cells. Since each individual LED light source may be separately controlled, unnecessary lights may be extinguished in an emergency. Remaining lights may be used to signal emergency routes which may be emergency exits, predetermined shelter such as in the event of a tornado, safe locations potentially determined in real time in the event of an intruder or other hazard. The remaining lights may also or alternatively be used to maintain nominal communications channels within the building. The signals in such instance may be unable to be carried through power lines, and so may alternatively be implemented through a repeater function from one light to the next to travel entirely through a chain of LED light source.

In accordance with another alternative embodiment of the present invention, building lighting may be modulated with time and date stamps or the like. Video recordings made within the space of modulated illumination will have an optical watermark automatically embedded therein. The embedding of such identifiable signals ensures the integrity of video recordings made under these lights.

Building management in accord with another embodiment of the invention further includes automated secured access control to apparatus such as doors, drawers, electronic computer operations, cars, thermostats, and any other devices that may be electronically controlled. By means of LED communication, the location of unauthorized devices as well as persons can be tracked or polled by the system. Doors, either locked or unlocked, can be manipulated in response to the location or movement of these devices or persons.

If audio and/or video is additionally enabled, either through communications badges or separate wall-mounted devices, the video can be used to capture the last-known conditions of a user or an area. This can be important in the event a disaster strikes that results in significant destruction of property or life.

An intelligent audio/visual observation and identification database system may also be coupled to sensors as disposed about a building. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED light source, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

Security zones which may use intelligent video/audio observation and identification database system may include, but are not necessarily limited to, areas such as airports, embassies, hospitals, schools, government buildings, commercial buildings, power plants, chemical plants, garages, and/or any other location for which the monitoring of vehicle or individual traffic and/or security is desirable.

An intelligent observation and identification database system may be arranged to learn the expected times for arrival and departure of individuals 10 and vehicles from various zones. Each time an individual or vehicle enters or exits a security zone, the system may record in the database the time and location of the arrival or exit. Thus, over time, the system may learn the expected arrival and departure times based upon the average of predetermined times, such as normal shift times. Thus, if a vehicle of an individual attempts to enter or exit a zone at a time other than the learned expected time of entry or exit, the system may alert security personnel to initiate an investigation.

If a low level tracking priority is assigned to the vehicle or individual, tracking may be accomplished by recording the location and time for each instance when the system identifies the vehicle or individual. Thus, a low level tracking priority may normally generate a log of when and where a vehicle or individual was seen. Over time, the system may learn typical paths, times and zones where specific vehicles and individuals spend their time. The system may then issue an alert when a vehicle or individual deviates from their normal path. For example, if a person normally may be found on the second floor, and they occasionally pass through first floor but have never gone to the fourth floor, then the system may alert security personnel if the person is identified by the system on the fourth floor.

Thus, the intelligent audio/visual observation and identification database system may be coupled to the operational systems for a building, such as locking systems for doors, lighting systems, air conditioning systems, and/or heating systems.

Another embodiment of the present invention incorporates guidance and communications systems. For exemplary purposes, consider the situation where a visitor wishes to meet with a regular building occupant. The visitor may be guided through any suitable color or intensity pattern such as but not limited to flashing patterns, color changes or the like in LED light source or other similar fixtures to the location or person they seek. Further, once within the same building space, the person being sought out may further be made conspicuous by similar changes in color or intensity pattern within the sought-person's communication badge, for exemplary purposes either within video display 1500 or optical transmitter 1300, as shown in FIG. 2B. Once again, such system control using the RGB LEDs of the present invention is simply a matter of software control.

In those embodiments where audio signaling or communications are enabled, and owing to the exact room position detection afforded by the present invention, location specific access intelligence may also be incorporated. As but one example, if a doctor is in a surgical room, the pager may remain silent. Once the doctor exits surgery, then the pager may be reactivated. This control may be automatic, simply incorporated into the programming of the system. As another example, students may use the preferred communication badge for communications similar to cellular telephones, including text messaging, voice communications, web access, and so forth. However, upon entering a classroom, communications might in one embodiment then be disabled, ensuring the students are not distracted with unauthorized activities. In addition to the foregoing, audio and video communications are possible in accord with light communications in locations and environments where cellular or radio communications may be impossible, forbidden, or unreliable, extending existing communications systems.

The name tag embodiment need not be restricted to use by people. The name tag embodiment may be associated with cars, for example. In such an embodiment, the car 205 includes a tag (not shown) that broadcasts a unique code that may either turn street lights 154 on or increase the brightness of dimly lit street lights, as shown in FIG. 6, similar to the hallway or room lights described above. There are numerous other embodiments. For example, such a device may be used to indicate that a car is authorized to enter a restricted area. Or, such a device may be used to pay tolls on highways or pay fees at a parking garage by uniquely identifying the vehicle and the account to be charged. Alternatively, such device may be used to open garage doors.

As stated above, the LEDs may be bi-directional. In at least one embodiment, the optical XCVR is comprised of bi-directional LEDs. In such an embodiment, the optical XCVR is constructed and arranged such that at least one of the bi-directional LEDs allows parallel transmitting and receiving of light signals.

Within the disclosure provided herein, the term "processor" refers to a processor, controller, microprocessor, microcontroller, mainframe computer or server, or any other device that can execute instructions, perform arithmetic and logic functions, access and write to memory, interface with peripheral devices, etc.

As described herein each, optical XCVR may also include non-volatile memory (FLASHRAM, EEPROM, and EPROM, for example) that may store firmware for the optical XCVR, as well as text information, audio signals, video signals, contact information for other users, etc., as is common with current cell phones.

In some embodiments, an optical signal amplifier is in communication with the photodiodes to increase the signal strength of the received light signals. In at least one embodiment, the LEDs are in operative communication with an LED power driver, ensuring a constant current source for the LEDs.

In some embodiments, the XCVRs and XCVRs within a name tag may include circuitry that performs modulation, demodulation, data compression, data decompression, up converting, down converting, coding, interleaving, pulse shaping, and other communication and signal processing techniques, as are known by those of ordinary skill in the art.

In at least one embodiment, the name tag of FIG. 2B is embedded with a unique code, similar in principle to the MAC address of a computer, for example. Thus, every name tag has a unique identifier. The XCVR broadcasts the unique code at regular intervals, or irregular intervals if desired. Optical XCVRs located within the user's building and near the user may then receive the unique code transmitted by the name tag.

In one embodiment the optical XCVRs of a communication system security badge or name tag may be used as an integral portion of an intelligent or artificially intelligent security and identification database system as utilized within a particular defined security zone or zones. In this embodiment the security badge or name tag may be used to track the entry, exit and location of individuals, and to identify acceptable profile parameters for individuals within the security zone.

In one embodiment the optical XCVRs of a user's security badge or name tag communicate with the optical XCVRs. The optical XCVRs may be placed in numerous locations as lighting sources. As shown in FIG. 3, a user is shown with a name tag that is broadcasting and receiving data over an optical link using the XCVR described in FIG. 1 to a ceiling mounted fixture. The XCVR as integral to a ceiling mounted or other type of light fixture may in turn be in direct communication with a computer, processor, microprocessor, mainframe computer or server, and/or other computing device as earlier described through the use of wire, cable, optically via pulsed light communication, over a Broad Band Power Line system or over any other type of communication system.

In one embodiment the intelligent security and database system may be utilized to flag discrepancies related to information accessible and processed from a stored and accumulated continuously evolving database of information, in order to centrally warn security, surveillance, and/or law enforcement officers as to the existence of a condition warranting further investigation.

In one embodiment the intelligent security and identification database system will search and/or screen all security badges or name tags for individuals entering into a security zone to identify information such as the name, employment position, employment location, expected hours of employment, security clearance for the employee, and expected paths of travel of the employee within a facility.

In one embodiment the intelligent security and identification database system will record the time, date, and place of entry of an individual having a security badge or name tag into, and out of, a secured zone. In this embodiment, the recorded information may be compared in real time to previously recorded conduct or parameters for the individual security badge or name tag, to automatically identify discrepancies. Discrepancies which exceed a pre-programmed threshold may be brought to the attention of security personnel.

In one embodiment the accumulation and storage of information of the type identified above, will occur within continuously updated and evolving files, to create a database for future reference, to enable law enforcement, surveillance, and/or security officers to implement profile searches to identify classes of individuals warranting further investigation.

In one embodiment a law enforcement, surveillance, and/or security officer, desiring to identify individuals within a security zone having inadequate clearance, would access the accumulated database to inquire as to the identity and location of all individuals within a security zone. Upon receipt of this inquiry the processor, mainframe computer or server, associated with the intelligent security and identification database system may then compare the identified individuals present within the applicable security zone, to the security clearance assigned to each individual, to identify the presence of an individual having inadequate security clearance.

In one embodiment this process is accomplished by the individual security badge or name tag optical XCVR continuously transmitting a pulsed light communication signal for receipt by a series of optical XCVRs integral to a series of lighting sources, or ceiling mounted light fixtures, within a building structure. The individual security badge or name tag would transmit through pulsed light communication information as previously identified as related to an individual's identity, employment occupation, security clearance, and/or primary employment location. In this embodiment, the pulsed light communication signal could be sequentially detected, received, and tracked by a plurality of XCVRs which are in continuous communication with the system processor.

In one embodiment a series of XCVRs are in communication with the system processor, mainframe computer or server, through sequential transmission and receipt of pulsed light communication signals.

In one embodiment the series of XCVRs are in communication with the system processor, mainframe computer or server, through the Broad Band Over Power Line Communication System as previously described herein.

In one embodiment the series of XCVRs are in communication with the system processor, mainframe computer or server through the use of cable, wire, or other communication media.

In one embodiment, an individual security badge or name tag may be assigned a number which is transmitted within the communication signal to the system processor, mainframe computer or server.

In one embodiment the system processor will continuously record and store in real time the received pulsed light communication signals for individual security badges or name tags in one or more system databases, one or more subsystem databases, or individuals specific databases, in order to establish normal routine parameters for designated locations or areas within a facility. The system processor may be programmed to compare previously stored data representative of normal routine parameters for a designated location within a facility, to the real time observed data for the designated location. The system processor preferably includes threshold software which may be used to identify any standard deviations from normal activity occurring within the designated location.

In one embodiment the system processor, mainframe computer or server may compare individual specific information with information concerning a designated location, as well as information about employees and/or supervisors in order to assist in a threshold analysis for indication of a warning or investigation signal or flag. For example, if an employee is tracked as accompanying a supervisor into an area where clearance is required, and the supervisor is identified as having the appropriate clearance, and the supervisor is identified as having authority to escort an employee not having a designated level of clearance within a particular zone, then a threshold for identification of required investigative action may not be met.

In one embodiment the system processor, mainframe computer or server may identify individual specific pulsed light communication signals received from a location outside of an established or normal routine, and outside of a set level of deviation, for triggering of a investigation advisory. An investigation advisory would issue for a specific location and individual within a zone or facility.

In one embodiment the communication system may also be used at a check point. Information transmitted from a security badge at a checkpoint could also include motor vehicle information, make, model, and/or license plate information for the particular employee. At a facility check point retrieved information could be displayed on a monitor. The database may also include a photo of the individual associated with the security badge, where all available information could be reviewed by a security office prior to entry by into a security zone.

In one embodiment each evolving database and/or mainframe database may be capable of being continuously updated to include data saved by the communication system. Software is preferably loaded onto the computer for creation of files representative of individuals. Access software may be used to communicate with internal databases or external or remote databases, and comparison software may be used to review data as related to the external and/or internal databases.

In one embodiment, sensitivity software is also used to establish thresholds and to issue/trigger investigation signals, which may be displayed on the output device or monitor, and category software may be used to divide data within individual files. In addition, any other software as desired by security and/or law enforcement personnel may be utilized.

In one embodiment, the computer may implement either standard or customized queries or searches for defined profiles related to individuals within the accumulated database for the security zone. Upon identification of individuals which satisfy the profile criteria, a communication signal will be generated to advise law enforcement, surveillance, or security zone officers as to the status and location of the individuals under investigation. The relative location of targeted individuals may be identified by proximity to one or more XCVRs as integral to lighting structures. It is anticipated that each XCVR will have a coded or digitized identification number which corresponds to a specific location within an overall communication/security plan for a facility. It is anticipated that each transmission of a communication pulsed light signal will include a code representative of the originating XCVR. Optionally additional intermediate XCVRs may add a communication pulsed light signal code representative of the transmitting XCVR.

In one embodiment, the computer may initiate an inquiry to locate the identification code corresponding to a particular individual. In this embodiment, the computer 22 would transmit a signal outwardly through the optically connected XCVRs to request identification of a particular individual identification code. In one embodiment the inquiry may be global, or may be limited to specific periods of time or other specific conditions such as location. In one embodiment each individual XCVR upon receipt of the command inquiry may forward by pulsed light signals the individual identification codes of all individuals within a particular location, because individual identity codes are being continuously transmitted by each individual security badge. In one embodiment the individual security badge under investigation may beep or generate another signal to advise the individual that he or she needs to contact a central switchboard for transfer to another individual or for receipt of a message.

In one embodiment the evolving database and/or mainframe database may be coupled to additional identification apparatus or systems including but not limited to facial recognition, fingerprint recognition, palm print recognition, voice print recognition, eye scan, and/or signature recognition devices/systems which may be coupled to the input devices for recording of data to be stored within the system for analysis and display of a monitor.

In one embodiment the communication system including the XCVR may be incorporated into a hand held or portable unit. In some embodiments the portable unit may be clipped onto a belt. In other embodiments the communication system may be incorporated into a device such as a cellular telephone. In this embodiment the communication system may be transported by a security officer or other designated employee within a facility.

In one embodiment the evolving database and/or mainframe database may include timing and other software which may be used to identify whether or not a security badge has been stationary for an excessive duration of time, which in turn would trigger an investigation signal or a communication signal to the stationary security badge to request an update for the status of the individual. The failure of a security badge to move relative to one or more XCVRs may indicate that a security badge has been removed by an individual and placed on a surface. Alternatively, the failure of a security badge to move relative to one or more XCVRs may indicate the existence of a medical problem requiring immediate attention.

In one embodiment the evolving database and/or mainframe database may illuminate a pathway on sequential XCVRs representative of the shortest route to a specific location to assist emergency personnel.

In one embodiment the evolving database and/or mainframe database may include probabilistic analysis software which may be used to assist in the establishment of threshold levels for issuing a warning or investigation signal. In addition the evolving database and/or mainframe database may include Principle Component Analysis (PCA) software and Eigenvector or Eigenspace decomposition analysis software to assist in the establishment of thresholds.

In one embodiment upon the detection of any threshold discrepancies related to an individual or security badge, the computer for the communication system may issue a flag to a security officer to investigate the individual or security badge. The communication system may thereby provide enhanced safety to the security zone functioning as a proactive automatic screening system.

In one embodiment the communication system may utilize security badges in areas such as airports, embassies, hospitals, schools, government buildings, commercial buildings, power plants, chemical plants, garages, and/or any other location for which the monitoring of an individual is desired.

In one embodiment the evolving database and/or mainframe database may learn the expected times for arrival and departure of particular individuals with respect to various zones. Each time an individual enters or exits a security zone, the evolving database and/or mainframe database may record in the database the time and location of the arrival or exit. Thus, over time, the communication system may learn the expected arrival and departure times based upon the average of a predetermined number of instances, or by the most common of a range of predetermined times, such as normal shift times. Thus, if an individual attempts to enter or exit a zone at a time other than the learned expected time of entry or exit, the evolving database and/or mainframe database may alert security personnel to initiate an investigation.

In one embodiment the evolving database and/or mainframe database may be programmed to assign a point system or flag upon the recognition of certain data and/or profile characteristics relative to an individual wearing a security badge. In one embodiment the computer will record and/or track the number of points or flags assigned to a particular individual. When a certain number of flags and/or points have been assigned, then the computer will emit or issue a signal to an officer, which may be ranked against other tasks in order of importance. The computer may store any information or data collected pertaining to the task, as well as the instruction for the task itself in the database.

Over time, in one embodiment the communication system may learn typical paths, times and areas where specific individuals spend their time. The communication system may then issue an alert when an individual deviates from an authorized area into an unauthorized zone. For example, if a person normally may be found on second floor, and the person occasionally passes through first floor, but have never gone to the fourth floor, then the communication system may alert security personnel if the person is identified as being present on fourth floor. The presence of the individual will be detected on the fourth floor due to the continuous emission of a signal as generated from the security badge, and as detected by an XCVR have a location address identified as being on the fourth floor. The XCVR detecting the pulsed light signal form the security badge issues a transmission for passage through a number of optically connected XCVRs for processing and storage at the evolving database and/or mainframe database of the processor.

In one embodiment, if a high level tracking priority is assigned to an individual, then continuous active tracking via software analysis of signals received by and as generated from a plurality of XCVRs is desirable. As such, the system may continually pinpoint the zone, and even the exact location of a person 56 within the zone.

In one embodiment, the evolving database and/or mainframe database may learn and recognize repetitive patterns within the accumulated database. Therefore, the computer may assess a low query priority to repetitive and/or regular patterns, and implement a more expedited search related to non-regular pattern data as stored within the accumulated database. Any parameters may be selected for the recognition of patterns within a security zone dependent upon individual environmental conditions and customized needs at each independent security zone. For example, six days of repetitive actions may be required to establish a regular pattern of conduct within a first security zone 50 where two months of repetitive conduct may be required to establish a regular pattern within a second security zone.

In one embodiment, during pattern learning, the computer sensitivity may be established by the initial creation of a file and/or data pertaining to an individual. Next, the input of a desired amount of data representative of repeated actions may be required. The number or amount of data may represent repetitive occurrences. The occurrences may be required to be within a certain classification, such as all within a certain zone, or all within a certain period of time during the day, such as between 3 and 4 o'clock p.m. The computer may then calculate a mean value based upon the recorded data. Alternatively, the recorded data may be divided into more than one segment and a mean may be calculated for each desired segment. The computer will generally continue to store data, and therefore update the pattern, as detected by the XCVRs. The computer is preferably designed to recalculate a mean for the data following each additional data entry. The computer may include sensitivity trigger software which as earlier described will identify a desired threshold deviation from the calculated mean, which may be more or less than one standard deviation from the calculated mean. Alternatively, the sensitivity trigger may be established at a certain percentage for deviation from the calculated mean. The computer continually compares the observed occurrence information to the calculated mean data to determine if investigation signals are required to be communicated to law enforcement and/or security officers. In this respect, the computer is engaged in updating activities becomes smarter and more efficient in analyzing risk situations over time.

In one embodiment the communication system is preferably proactive and is continuously screening and comparing data being input from the XCVRs for comparison to the previously stored records within the accumulated database.

Another embodiment of the present invention incorporates Global Positioning System (GPS) information into the data packet to be sent. The Global Positioning System is described in U.S. Pat. No. 4,785,463, the entire contents of which are expressly incorporated herein by reference. GPS positioning uses one or more coordinate systems, such as World Geodetic System 1984 (WGS84), to provide a reference frame, allowing every point on earth to be coded with a unique GPS location.

A data packet may include GPS location header bits that include the packet's destination address in GPS coordinates. The data packet may further include GPS location trailer bits that include the packet's origin address in GPS coordinates. The data packet may further include the address in GPS coordinates of the optical XCVR that most recently transmitted the packet (the last known transmission address, or LTA), as will be described in more detail below. The data packet further includes the data to be transmitted, and may include any other bits of information determined to be necessary for successful transmission of data, such as error detection bits, as understood by a person of ordinary skill in the art.

Routing data packets from one location to another location can be accomplished using GPS location information tags data packets having a geographic location instead of a cyber-location. Such an embodiment eliminates the need for any later geographic location translation because a data packet starts with geographic source and destination information. This simplifies locating the destination of the data packet.

Figure 12:
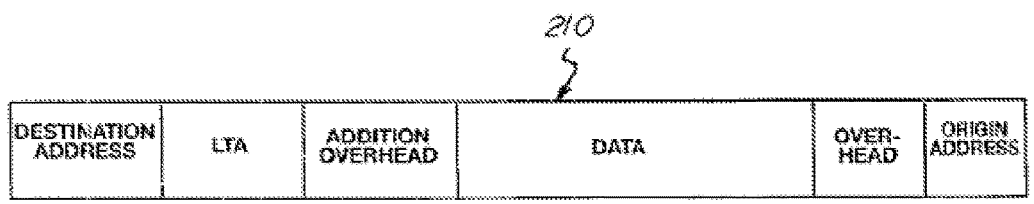
FIG. 12 is a block diagram of an exemplary embodiment of a data packet.

In some embodiments, each data packet is assigned a GPS origin/destination address as it passes through the network infrastructure. The data packet is always searching for the next closest GPS address location. Each stationary (or static) optical XCVR, and some dynamic optical XCVRs, within a network will be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet. If the ILA code is closer to the data packet destination address than the LTA code stored within the data packet, the optical XCVR's processor inserts its ILA code into the data packet as the new LTA code and then repeats transmission of the entire data packet with the updated LTA code. An exemplary data packet 210 including GPS address information is shown in FIG. 12.

The network continues this process until the data packet reaches the destination optical XCVR, at which point the data packet is transmitted. If a piece of the infrastructure is missing, the packet will be rerouted to the next nearest optical XCVR and continue until it finds the shortest pathway through the network to the destination address.

This means that each user on the network may declare one or more static positions and also have a dynamic position. A static address may be a home, an office, etc. When a user leaves their static address location to move through the network infrastructure, the user then becomes dynamic. The network may track the user as the user passes optical XCVRs, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

In at least one embodiment, the pulsed LED light signal may be used to generate optical pulses to be received by a first receiver to transmit a security code for access to a gated community, garage, and/or secure parking lot. In these instances, the second LED illumination sources generate a pulsed LED light signal for receipt by the first receiver which in turn is coupled to a first controller and a switch to open an otherwise locked gate.

In addition to being directed to the embodiments described above and claimed below, the present invention is further directed to embodiments having different combinations of the features described above and claimed below. As such, the invention is also directed to other embodiments having any other possible combination of the dependent features claimed below.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

What is claimed is:

1. A light emitting diode light and communication system comprising:

at least one optical transceiver comprising at least one optical transceiver location identifier, the at least one optical transceiver further comprising:

a light support having at least one light emitting diode, at least one photodetector, and a camera, said at least one light emitting diode generating illumination, said illumination comprising a plurality of flashes of illumination having a frequency which is not observable to the unaided eyes of an individual; and a processor in communication with the at least one light emitting diode, the at least one photodetector, and said camera, the processor constructed and arranged to regulate said plurality of flashes of illumination to generate at least one transmitted signal embedded within said illumination, said at least one transmitted signal comprising said at least one optical transceiver location identifier, said processor further comprising at least one signal processing routine selected from the group consisting of modulation, demodulation, data compression, data decompression, up converting, down converting, coding, interleaving, and pulse shaping, wherein the at least one optical transceiver is engaged to a lighting fixture.

2. The light emitting diode light and communication system of claim 1, said processor further comprising device activation priority data.

3. The light emitting diode light and communication system of claim 1, said processor further comprising signal recognition software.

4. The light emitting diode light and communication system of claim 3, said signal recognition software being constructed and arranged to activate upon receipt of at least one accepted code transmitted from at least one of said optical transceivers.

5. The light emitting diode light and communication system of claim 3, wherein said signal recognition software is further constructed and arranged to regulate said plurality of flashes of illumination.

6. The light emitting diode light and communication system of claim 3, said signal recognition software being constructed and arranged to issue at least one action.

7. The light emitting diode light and communication system of claim 6, said action being selected from the group consisting of location identification, illumination detection, illumination regulation, signal generation, tracking, guidance, regulating door access, regulating computer access, regulating vehicle access, and regulating thermostats and combinations thereof.

8. The light emitting diode light and communication system of claim 1, further comprising an intelligent database system in communication with said light emitting diode light and communication system.

9. The light emitting diode light and communication system of claim 1, further comprising a plurality of optical transceivers providing illumination, said processor being constructed and arranged to sequentially activate or deactivate illumination from said plurality of optical transceivers.

10. The light emitting diode light and communication system of claim 8, said intelligent database system comprising at least one evolving database.

11. The light emitting diode light and communication system of claim 10, said intelligent database system comprising proximity identification software in communication with said processor.

12. The light emitting diode light and communication system of claim 8, said processor being further constructed and arranged to issue a device operation signal for an electronic device, said electronic device being selected from the group consisting of door locks, hallway lighting, room lighting, telephone, motion detector, air-conditioning unit, metal detectors, sniffers, X-Ray machines, proximity calculators, drawers, computer and thermostat.

13. The light emitting diode light and communication system of claim 8, said processor being further constructed and arranged to activate the at least one detection sensor selected from the group consisting of a sound sensor, temperature sensor, motion sensor, pressure sensor, smoke sensor and fire detector.

14. The light emitting diode light and communication system of claim 8, said processor being further constructed and arranged to activate a biometric identification apparatus selected from the group consisting of a facial scanner, fingerprint scanner, palm scanner, voice scanner, people scanner and signature scanner.

15. The light emitting diode light and communication system of claim 1, said at least one transmitted signal further comprising time and date information.

16. A light emitting diode light and communication system comprising:

at least one optical transceiver comprising at least one optical transceiver location identifier, the at least one optical transceiver further comprising:

a light support having at least one light emitting diode, at least one photodetector, and at least one microphone, said at least one light emitting diode generating illumination, said illumination comprising a plurality of flashes of illumination having a frequency which is not observable to the unaided eyes of an individual; and a processor in communication with the at least one light emitting diode, the at least one photodetector, and the at least one microphone, the processor constructed and arranged to regulate said plurality of flashes of illumination to generate at least one transmitted signal embedded within said illumination said at least one transmitted signal comprising said at least one optical transceiver location identifier.

17. The light emitting diode light and communication system of claim 16, said at least one processor comprising signal recognition software and device activation priority data, said signal recognition software being constructed and arranged to activate upon receipt of at least one accepted code.

* * * * *